United States Patent
Kato et al.

(10) Patent No.: US 8,336,786 B2
(45) Date of Patent: Dec. 25, 2012

(54) WIRELESS COMMUNICATION DEVICE AND METAL ARTICLE

(75) Inventors: Noboru Kato, Nagaokakyo (JP); Koji Shiroki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/429,465

(22) Filed: Mar. 26, 2012

(65) Prior Publication Data

US 2012/0187198 A1  Jul. 26, 2012

Related U.S. Application Data

(63) Continuation of application No. PCT/JP2011/053654, filed on Feb. 21, 2011.

(30) Foreign Application Priority Data

Mar. 12, 2010  (JP) .................................. 2010-055803

(51) Int. Cl.
*G06K 19/06* (2006.01)

(52) U.S. Cl. ........................................ 235/492; 235/451

(58) Field of Classification Search .................. 235/375, 235/451, 486, 487, 492; 340/10.1, 10.2, 340/572.1, 572.2, 572.7
See application file for complete search history.

(56) References Cited

U.S. PATENT DOCUMENTS

| 3,364,564 A | 1/1968 | Kurtz et al. |
| 4,794,397 A | 12/1988 | Ohe et al. |
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |
| 5,757,074 A | 5/1998 | Matloubian et al. |
| 5,854,480 A | 12/1998 | Noto |
| 5,903,239 A | 5/1999 | Takahashi et al. |

(Continued)

FOREIGN PATENT DOCUMENTS

CA  2 279 176 A1  7/1998

(Continued)

OTHER PUBLICATIONS

Official communication issued in counterpart International Application No. PCT/JP2008/071502, mailed Feb. 24, 2009.

(Continued)

*Primary Examiner* — Tuyen K Vo
(74) *Attorney, Agent, or Firm* — Keating & Bennett, LLP

(57) ABSTRACT

A wireless communication device includes a wireless IC device, a dielectric substrate, and a metal plate. A radiation conductor coupled to the wireless IC device is provided on the front surface of the dielectric substrate, and a ground conductor connected to the radiation conductor through an interlayer connection conductor is provided on a back surface. The dielectric substrate is fixed to the metal plate via an insulating adhesive, and is crimped by a conductive member. The front and back surfaces of the metal plate are electrically connected to each other by the conductive member, and when a high-frequency signal is supplied from the wireless IC device, a high-frequency signal current on the front surface side of the metal plate is conducted to the back surface side of the metal plate through a surface boundary portion between the conductive member and the metal plate, and radiated as a high-frequency signal.

8 Claims, 12 Drawing Sheets

U.S. PATENT DOCUMENTS

| | | |
|---|---|---|
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,104,611 A | 8/2000 | Glover et al. |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,243,045 B1 | 6/2001 | Ishibashi |
| 6,249,258 B1 | 6/2001 | Bloch et al. |
| 6,259,369 B1 | 7/2001 | Monico |
| 6,271,803 B1 | 8/2001 | Watanabe et al. |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,452,563 B1 | 9/2002 | Porte |
| 6,462,716 B1 | 10/2002 | Kushihi |
| 6,542,050 B1 | 4/2003 | Arai et al. |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,956,481 B1 | 10/2005 | Cole |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,229,018 B2 * | 6/2007 | Kurz ............................ 235/441 |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 8,042,742 B2 * | 10/2011 | Kagaya et al. ................ 235/492 |
| 2001/0011012 A1 | 8/2001 | Hino et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2004/0001027 A1 | 1/2004 | Killen et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0001031 A1 | 1/2005 | Akiho et al. |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0000915 A1 * | 1/2006 | Kodukula et al. ............. 235/492 |
| 2006/0001138 A1 | 1/2006 | Sakama et al. |
| 2006/0026819 A1 * | 2/2006 | Kurz ............................ 29/601 |
| 2006/0032926 A1 | 2/2006 | Baba et al. |
| 2006/0044192 A1 | 3/2006 | Egbert |
| 2006/0055531 A1 | 3/2006 | Cook et al. |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0214801 A1 | 9/2006 | Murofushi et al. |
| 2006/0220871 A1 | 10/2006 | Baba et al. |
| 2006/0244568 A1 | 11/2006 | Tong et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0200782 A1 | 8/2007 | Hayama et al. |
| 2007/0229276 A1 | 10/2007 | Yamagajo et al. |
| 2007/0247387 A1 | 10/2007 | Kubo et al. |
| 2007/0252700 A1 | 11/2007 | Ishihara et al. |
| 2007/0252703 A1 | 11/2007 | Kato et al. |
| 2007/0252763 A1 | 11/2007 | Martin |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0068132 A1 | 3/2008 | Kayanakis et al. |
| 2008/0070003 A1 | 3/2008 | Nakatani et al. |
| 2008/0087990 A1 | 4/2008 | Kato et al. |
| 2008/0143630 A1 | 6/2008 | Kato et al. |
| 2008/0169905 A1 | 7/2008 | Slatter |
| 2008/0184281 A1 | 7/2008 | Ashizaki et al. |
| 2008/0272885 A1 | 11/2008 | Atherton |
| 2009/0002130 A1 | 1/2009 | Kato |
| 2009/0009007 A1 * | 1/2009 | Kato et al. ..................... 307/104 |
| 2009/0021352 A1 | 1/2009 | Kataya et al. |
| 2009/0021446 A1 | 1/2009 | Kataya et al. |
| 2009/0065594 A1 | 3/2009 | Kato et al. |
| 2009/0109102 A1 | 4/2009 | Dokai et al. |
| 2009/0160719 A1 * | 6/2009 | Kato et al. ..................... 343/742 |
| 2009/0201116 A1 | 8/2009 | Orihara |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0266900 A1 * | 10/2009 | Ikemoto et al. ................ 235/492 |
| 2009/0278687 A1 | 11/2009 | Kato |
| 2009/0321527 A1 | 12/2009 | Kato et al. |
| 2010/0035539 A1 * | 2/2010 | Yoshida et al. .................. 455/1 |
| 2010/0103058 A1 | 4/2010 | Kato et al. |
| 2010/0181379 A1 * | 7/2010 | Okegawa et al. .............. 235/488 |
| 2010/0182210 A1 | 7/2010 | Ryou et al. |
| 2010/0219253 A1 * | 9/2010 | Katsumata .................... 235/492 |
| 2010/0308118 A1 | 12/2010 | Kataya et al. |
| 2011/0031320 A1 | 2/2011 | Kato et al. |
| 2011/0063184 A1 | 3/2011 | Furumura et al. |

FOREIGN PATENT DOCUMENTS

| | | |
|---|---|---|
| DE | 10 2006 057 369 A1 | 6/2008 |
| EP | 0 694 874 A2 | 1/1996 |
| EP | 0 848 448 A2 | 6/1998 |
| EP | 0 948 083 A2 | 10/1999 |
| EP | 0 977 145 A2 | 2/2000 |
| EP | 1 010 543 A1 | 6/2000 |
| EP | 1 085 480 A1 | 3/2001 |
| EP | 1 160 915 A2 | 12/2001 |
| EP | 1 170 795 A2 | 1/2002 |
| EP | 1 193 793 A2 | 4/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 547 753 A1 | 6/2005 |
| EP | 1 548 872 A1 | 6/2005 |
| EP | 1 626 364 A2 | 2/2006 |

| | | | | | | |
|---|---|---|---|---|---|---|
| EP | 1 701 296 A1 | 9/2006 | | JP | 11-103209 A | 4/1999 |
| EP | 1 703 589 A1 | 9/2006 | | JP | 11-149536 A | 6/1999 |
| EP | 1 742 296 A1 | 1/2007 | | JP | 11-149537 A | 6/1999 |
| EP | 1 744 398 A1 | 1/2007 | | JP | 11-149538 A | 6/1999 |
| EP | 1 840 802 A1 | 10/2007 | | JP | 11-175678 A | 7/1999 |
| EP | 1 841 005 A1 | 10/2007 | | JP | 11-219420 A | 8/1999 |
| EP | 1 865 574 A1 | 12/2007 | | JP | 11-220319 A | 8/1999 |
| EP | 1 887 652 A1 | 2/2008 | | JP | 11-282993 A | 10/1999 |
| EP | 1 976 056 A1 | 10/2008 | | JP | 11-328352 A | 11/1999 |
| EP | 1 988 491 A1 | 11/2008 | | JP | 11-331014 A | 11/1999 |
| EP | 1 988 601 A1 | 11/2008 | | JP | 11-346114 A | 12/1999 |
| EP | 1 993 170 A1 | 11/2008 | | JP | 11-515094 A | 12/1999 |
| EP | 2 009 738 A1 | 12/2008 | | JP | 2000-21128 A | 1/2000 |
| EP | 2 012 258 A1 | 1/2009 | | JP | 2000-021639 A | 1/2000 |
| EP | 2 096 709 A1 | 9/2009 | | JP | 2000-022421 A | 1/2000 |
| EP | 2 148 449 A1 | 1/2010 | | JP | 2000-059260 A | 2/2000 |
| EP | 2 166 617 A1 | 3/2010 | | JP | 2000-085283 A | 3/2000 |
| EP | 2 251 934 A1 | 11/2010 | | JP | 2000-090207 A | 3/2000 |
| EP | 2 256 861 A1 | 12/2010 | | JP | 2000-132643 A | 5/2000 |
| EP | 2 330 684 A1 | 6/2011 | | JP | 2000-137778 A | 5/2000 |
| GB | 2 305 075 A | 3/1997 | | JP | 2000-137779 A | 5/2000 |
| GB | 2461443 A | 1/2010 | | JP | 2000-137785 A | 5/2000 |
| JP | 50-143451 A | 11/1975 | | JP | 2000-148948 A | 5/2000 |
| JP | 61-284102 A | 12/1986 | | JP | 2000-172812 A | 6/2000 |
| JP | 62-127140 U | 8/1987 | | JP | 2000-209013 A | 7/2000 |
| JP | 01-212035 A | 8/1989 | | JP | 2000-222540 A | 8/2000 |
| JP | 02-164105 A | 6/1990 | | JP | 2000-510271 A | 8/2000 |
| JP | 02-256208 A | 10/1990 | | JP | 2000-242754 A | 9/2000 |
| JP | 3-171385 A | 7/1991 | | JP | 2000-243797 A | 9/2000 |
| JP | 03-503467 A | 8/1991 | | JP | 2000-251049 A | 9/2000 |
| JP | 03-262313 A | 11/1991 | | JP | 2000-261230 A | 9/2000 |
| JP | 04-150011 A | 5/1992 | | JP | 2000-276569 A | 10/2000 |
| JP | 04-167500 A | 6/1992 | | JP | 2000-286634 A | 10/2000 |
| JP | 04-096814 U | 8/1992 | | JP | 2000-286760 A | 10/2000 |
| JP | 04-101168 U | 9/1992 | | JP | 2000-311226 A | 11/2000 |
| JP | 04-134807 U | 12/1992 | | JP | 2000-321984 A | 11/2000 |
| JP | 05-226926 A | 9/1993 | | JP | 2000-349680 A | 12/2000 |
| JP | 05-327331 A | 12/1993 | | JP | 2001-10264 A | 1/2001 |
| JP | 6-53733 A | 2/1994 | | JP | 2001-028036 A | 1/2001 |
| JP | 06-077729 A | 3/1994 | | JP | 2001-043340 A | 2/2001 |
| JP | 06-029215 U | 4/1994 | | JP | 3075400 U | 2/2001 |
| JP | 06-177635 A | 6/1994 | | JP | 2001-66990 A | 3/2001 |
| JP | 6-260949 A | 9/1994 | | JP | 2001-76111 A | 3/2001 |
| JP | 07-183836 A | 7/1995 | | JP | 2001-084463 A | 3/2001 |
| JP | 08-055725 A | 2/1996 | | JP | 2001-101369 A | 4/2001 |
| JP | 08-056113 A | 2/1996 | | JP | 2001-505682 A | 4/2001 |
| JP | 8-87580 A | 4/1996 | | JP | 2001-168628 A | 6/2001 |
| JP | 08-088586 A | 4/1996 | | JP | 2001-188890 A | 7/2001 |
| JP | 08-88586 A | 4/1996 | | JP | 2001-209767 A | 8/2001 |
| JP | 08-176421 A | 7/1996 | | JP | 2001-240046 A | 9/2001 |
| JP | 08-180160 A | 7/1996 | | JP | 2001-240217 A | 9/2001 |
| JP | 08-279027 A | 10/1996 | | JP | 2001-256457 A | 9/2001 |
| JP | 08-307126 A | 11/1996 | | JP | 2001-257292 A | 9/2001 |
| JP | 08-330372 A | 12/1996 | | JP | 2001-514777 A | 9/2001 |
| JP | 09-014150 A | 1/1997 | | JP | 2001-291181 A | 10/2001 |
| JP | 09-035025 A | 2/1997 | | JP | 2001-319380 A | 11/2001 |
| JP | 9-93029 A | 4/1997 | | JP | 2001-331976 A | 11/2001 |
| JP | 09-093029 A | 4/1997 | | JP | 2001-332923 A | 11/2001 |
| JP | 09-245381 A | 9/1997 | | JP | 2001-339226 A | 12/2001 |
| JP | 09-252217 A | 9/1997 | | JP | 2001-344574 A | 12/2001 |
| JP | 09-270623 A | 10/1997 | | JP | 2001-351083 A | 12/2001 |
| JP | 09-284038 A | 10/1997 | | JP | 2001-351084 A | 12/2001 |
| JP | 9-512367 A | 12/1997 | | JP | 2001-352176 A | 12/2001 |
| JP | 10-069533 A | 3/1998 | | JP | 2001-358527 A | 12/2001 |
| JP | 10-69533 A | 3/1998 | | JP | 2002-024776 A | 1/2002 |
| JP | 10-505466 A | 5/1998 | | JP | 2002-026513 A | 1/2002 |
| JP | 10-171954 A | 6/1998 | | JP | 2002-32731 A | 1/2002 |
| JP | 10-173427 A | 6/1998 | | JP | 2002-042076 A | 2/2002 |
| JP | 10-193849 A | 7/1998 | | JP | 2002-042083 A | 2/2002 |
| JP | 10-193851 A | 7/1998 | | JP | 2002-063557 A | 2/2002 |
| JP | 10-242742 A | 9/1998 | | JP | 2002-505645 A | 2/2002 |
| JP | 10-293828 A | 11/1998 | | JP | 2002-76750 A | 3/2002 |
| JP | 10-334203 A | 12/1998 | | JP | 2002-076750 A | 3/2002 |
| JP | 11-025244 A | 1/1999 | | JP | 2002-111363 A | 4/2002 |
| JP | 11-039441 A | 2/1999 | | JP | 2002-150245 A | 5/2002 |
| JP | 11-075329 A | 3/1999 | | JP | 2002-157564 A | 5/2002 |
| JP | 11-085937 A | 3/1999 | | JP | 2002-158529 A | 5/2002 |
| JP | 11-88241 A | 3/1999 | | JP | 2002-175508 A | 6/2002 |
| JP | 11-102424 A | 4/1999 | | JP | 2002-183676 A | 6/2002 |

| | | | | | | |
|---|---|---|---|---|---|---|
| JP | 2002-183690 A | 6/2002 | | JP | 2004-163134 A | 6/2004 |
| JP | 2002-185358 A | 6/2002 | | JP | 2004-213582 A | 7/2004 |
| JP | 2002-204117 A | 7/2002 | | JP | 2004-519916 A | 7/2004 |
| JP | 2002-521757 A | 7/2002 | | JP | 2004-234595 A | 8/2004 |
| JP | 2002-522849 A | 7/2002 | | JP | 2004-253858 A | 9/2004 |
| JP | 2002-230128 A | 8/2002 | | JP | 2004-527864 A | 9/2004 |
| JP | 2002-232221 A | 8/2002 | | JP | 2004-280390 A | 10/2004 |
| JP | 2002-246828 A | 8/2002 | | JP | 2004-282403 A | 10/2004 |
| JP | 2002-252117 A | 9/2002 | | JP | 2004-287767 A | 10/2004 |
| JP | 2002-259934 A | 9/2002 | | JP | 2004-295297 A | 10/2004 |
| JP | 2002-280821 A | 9/2002 | | JP | 2004-297249 A | 10/2004 |
| JP | 2002-298109 A | 10/2002 | | JP | 2004-297681 A | 10/2004 |
| JP | 2002-308437 A | 10/2002 | | JP | 2004-304370 A | 10/2004 |
| JP | 2002-319008 A | 10/2002 | | JP | 2004-319848 A | 11/2004 |
| JP | 2002-319009 A | 10/2002 | | JP | 2004-326380 A | 11/2004 |
| JP | 2002-319812 A | 10/2002 | | JP | 2004-334268 A | 11/2004 |
| JP | 2002-362613 A | 12/2002 | | JP | 2004-336250 A | 11/2004 |
| JP | 2002-366917 A | 12/2002 | | JP | 2004-343000 A | 12/2004 |
| JP | 2002-373029 A | 12/2002 | | JP | 2004-362190 A | 12/2004 |
| JP | 2002-373323 A | 12/2002 | | JP | 2004-362341 A | 12/2004 |
| JP | 2002-374139 A | 12/2002 | | JP | 2004-362602 A | 12/2004 |
| JP | 2003-006599 A | 1/2003 | | JP | 2005-5866 A | 1/2005 |
| JP | 2003-016412 A | 1/2003 | | JP | 2005-18156 A | 1/2005 |
| JP | 2003-022912 A | 1/2003 | | JP | 2005-033461 A | 2/2005 |
| JP | 2003-026177 A | 1/2003 | | JP | 2005-064799 A | 3/2005 |
| JP | 2003-030612 A | 1/2003 | | JP | 2005-124061 A | 5/2005 |
| JP | 2003-037861 A | 2/2003 | | JP | 2005-128592 A | 5/2005 |
| JP | 2003-44789 A | 2/2003 | | JP | 2005-129019 A | 5/2005 |
| JP | 2003-046318 A | 2/2003 | | JP | 2005-135132 A | 5/2005 |
| JP | 2003-58840 A | 2/2003 | | JP | 2005-136528 A | 5/2005 |
| JP | 2003-067711 A | 3/2003 | | JP | 2005-137032 A | 5/2005 |
| JP | 2003-069335 A | 3/2003 | | JP | 3653099 B2 | 5/2005 |
| JP | 2003-076947 A | 3/2003 | | JP | 2005-165839 A | 6/2005 |
| JP | 2003-76963 A | 3/2003 | | JP | 2005-167327 A | 6/2005 |
| JP | 2003-78333 A | 3/2003 | | JP | 2005-167813 A | 6/2005 |
| JP | 2003-078336 A | 3/2003 | | JP | 2005-190417 A | 7/2005 |
| JP | 2003-085501 A | 3/2003 | | JP | 2005-191705 A | 7/2005 |
| JP | 2003-085520 A | 3/2003 | | JP | 2005-192124 A | 7/2005 |
| JP | 2003-87008 A | 3/2003 | | JP | 2005-204038 A | 7/2005 |
| JP | 2003-87044 A | 3/2003 | | JP | 2005-210223 A | 8/2005 |
| JP | 2003-099184 A | 4/2003 | | JP | 2005-210676 A | 8/2005 |
| JP | 2003-099720 A | 4/2003 | | JP | 2005-210680 A | 8/2005 |
| JP | 2003-099721 A | 4/2003 | | JP | 2005-217822 A | 8/2005 |
| JP | 2003-110344 A | 4/2003 | | JP | 2005-229474 A | 8/2005 |
| JP | 2003-132330 A | 5/2003 | | JP | 2005-236339 A | 9/2005 |
| JP | 2003-134007 A | 5/2003 | | JP | 2005-244778 A | 9/2005 |
| JP | 2003-155062 A | 5/2003 | | JP | 2005-252853 A | 9/2005 |
| JP | 2003-158414 A | 5/2003 | | JP | 2005-275870 A | 10/2005 |
| JP | 2003-168760 A | 6/2003 | | JP | 2005-284352 A | 10/2005 |
| JP | 2003-179565 A | 6/2003 | | JP | 2005-284455 A | 10/2005 |
| JP | 2003-187207 A | 7/2003 | | JP | 2005-293537 A | 10/2005 |
| JP | 2003-187211 A | 7/2003 | | JP | 2005-295135 A | 10/2005 |
| JP | 2003-188338 A | 7/2003 | | JP | 2005-311205 A | 11/2005 |
| JP | 2003-188620 A | 7/2003 | | JP | 2005-321305 A | 11/2005 |
| JP | 2003-198230 A | 7/2003 | | JP | 2005-322119 A | 11/2005 |
| JP | 2003-209421 A | 7/2003 | | JP | 2005-335755 A | 12/2005 |
| JP | 2003-216919 A | 7/2003 | | JP | 2005-340759 A | 12/2005 |
| JP | 2003-218624 A | 7/2003 | | JP | 2005-345802 A | 12/2005 |
| JP | 2003-233780 A | 8/2003 | | JP | 2005-346820 A | 12/2005 |
| JP | 2003-242471 A | 8/2003 | | JP | 2005-352858 A | 12/2005 |
| JP | 2003-243918 A | 8/2003 | | JP | 2006-013976 A | 1/2006 |
| JP | 2003-249813 A | 9/2003 | | JP | 2006-13976 A | 1/2006 |
| JP | 2003-529163 A | 9/2003 | | JP | 2006-025390 A | 1/2006 |
| JP | 2003-288560 A | 10/2003 | | JP | 2006-031766 A | 2/2006 |
| JP | 2003-309418 A | 10/2003 | | JP | 2006-033312 A | 2/2006 |
| JP | 2003-317060 A | 11/2003 | | JP | 2006-39902 A | 2/2006 |
| JP | 2003-331246 A | 11/2003 | | JP | 2006-039947 A | 2/2006 |
| JP | 2003-332820 A | 11/2003 | | JP | 2006-42059 A | 2/2006 |
| JP | 2003-536302 A | 12/2003 | | JP | 2006-42097 A | 2/2006 |
| JP | 2004-040597 A | 2/2004 | | JP | 2006-050200 A | 2/2006 |
| JP | 2004-505481 A | 2/2004 | | JP | 2006-053833 A | 2/2006 |
| JP | 2004-082775 A | 3/2004 | | JP | 2006-67479 A | 3/2006 |
| JP | 2004-88218 A | 3/2004 | | JP | 2006-72706 A | 3/2006 |
| JP | 2004-93693 A | 3/2004 | | JP | 2006-074348 A | 3/2006 |
| JP | 2004-096566 A | 3/2004 | | JP | 2006-80367 A | 3/2006 |
| JP | 2004-096618 A | 3/2004 | | JP | 2006-92630 A | 4/2006 |
| JP | 2004-126750 A | 4/2004 | | JP | 2006-102953 A | 4/2006 |
| JP | 2004-127230 A | 4/2004 | | JP | 2006-107296 A | 4/2006 |
| JP | 2004-140513 A | 5/2004 | | JP | 2006-513594 A | 4/2006 |

| | | | | | | | |
|---|---|---|---|---|---|---|---|
| JP | 2006-148462 | A | 6/2006 | JP | 2009-25870 | A | 2/2009 |
| JP | 2006-148518 | A | 6/2006 | JP | 2009-27291 | A | 2/2009 |
| JP | 2006-151402 | A | 6/2006 | JP | 2009-044647 | A | 2/2009 |
| JP | 2006-174151 | A | 6/2006 | JP | 2009-044715 | A | 2/2009 |
| JP | 2006-195795 | A | 7/2006 | JP | 3148168 | U | 2/2009 |
| JP | 2006-203187 | A | 8/2006 | JP | 2009-110144 | A | 5/2009 |
| JP | 2006-203852 | A | 8/2006 | JP | 2009-153166 | A | 7/2009 |
| JP | 2006-217000 | A | 8/2006 | JP | 2009-182630 | A | 8/2009 |
| JP | 2006-232292 | A | 9/2006 | JP | 2009-213169 | A | 9/2009 |
| JP | 2006-237674 | A | 9/2006 | JP | 2010-009196 | A | 1/2010 |
| JP | 2006-238282 | A | 9/2006 | JP | 2010-050844 | A | 3/2010 |
| JP | 2006-246372 | A | 9/2006 | JP | 2010-081571 | | 4/2010 |
| JP | 2006-270212 | A | 10/2006 | JP | 4609604 | B2 | 1/2011 |
| JP | 2006-270681 | A | 10/2006 | NL | 9100176 | A | 3/1992 |
| JP | 2006-270766 | A | 10/2006 | NL | 9100347 | A | 3/1992 |
| JP | 2006-285911 | A | 10/2006 | WO | 98/33142 | A1 | 7/1998 |
| JP | 2006-287659 | A | 10/2006 | WO | 99/67754 | A1 | 12/1999 |
| JP | 2006-295879 | A | 10/2006 | WO | 00/10122 | A2 | 2/2000 |
| JP | 2006-302219 | A | 11/2006 | WO | 01/95242 | A2 | 12/2001 |
| JP | 2006-309401 | A | 11/2006 | WO | 02/48980 | A1 | 6/2002 |
| JP | 2006-311239 | A | 11/2006 | WO | 02/061675 | A1 | 8/2002 |
| JP | 2006-323481 | A | 11/2006 | WO | 02/097723 | A1 | 12/2002 |
| JP | 2006-339964 | A | 12/2006 | WO | 03/079305 | A1 | 9/2003 |
| JP | 2007-007888 | A | 1/2007 | WO | 2004/036772 | A2 | 4/2004 |
| JP | 2007-13120 | A | 1/2007 | WO | 2004/070879 | A | 8/2004 |
| JP | 2007-18067 | A | 1/2007 | WO | 2004/072892 | A2 | 8/2004 |
| JP | 2007-019905 | A | 1/2007 | WO | 2005/073937 | A | 8/2005 |
| JP | 2007-28002 | A | 2/2007 | WO | 2005/091434 | A1 | 9/2005 |
| JP | 2007-040702 | A | 2/2007 | WO | 2005/115849 | A1 | 12/2005 |
| JP | 2007-043535 | A | 2/2007 | WO | 2006/045682 | A | 5/2006 |
| JP | 2007-048126 | A | 2/2007 | WO | 2006/048663 | A1 | 5/2006 |
| JP | 2007-65822 | A | 3/2007 | WO | 2006/114821 | A1 | 11/2006 |
| JP | 2007-79687 | A | 3/2007 | WO | 2007/083574 | A1 | 7/2007 |
| JP | 2007-81712 | A | 3/2007 | WO | 2007/083575 | A1 | 7/2007 |
| JP | 2007-096768 | A | 4/2007 | WO | 2007/086130 | A1 | 8/2007 |
| JP | 2007-102348 | A | 4/2007 | WO | 2007/094494 | A1 | 8/2007 |
| JP | 2007-116347 | A | 5/2007 | WO | 2007/097385 | A1 | 8/2007 |
| JP | 2007-122542 | A | 5/2007 | WO | 2007/102360 | A1 | 9/2007 |
| JP | 2007-150642 | A | 6/2007 | WO | 2007/105348 | A1 | 9/2007 |
| JP | 2007-150868 | A | 6/2007 | WO | 2007/119310 | A1 | 10/2007 |
| JP | 2007-159083 | A | 6/2007 | WO | 2007/125683 | A1 | 11/2007 |
| JP | 2007-159129 | A | 6/2007 | WO | 2007/132094 | A1 | 11/2007 |
| JP | 2007-166133 | A | 6/2007 | WO | 2007/138857 | A1 | 12/2007 |
| JP | 3975918 | B2 | 6/2007 | WO | 2008/007606 | A | 1/2008 |
| JP | 2007-172369 | A | 7/2007 | WO | 2008/081699 | A1 | 7/2008 |
| JP | 2007-172527 | A | 7/2007 | WO | 2008/126458 | A1 | 10/2008 |
| JP | 2007-524942 | A | 8/2007 | WO | 2008/133018 | A1 | 11/2008 |
| JP | 2007-228254 | A | 9/2007 | WO | 2008/140037 | A1 | 11/2008 |
| JP | 2007-228325 | A | 9/2007 | WO | 2008/142957 | A1 | 11/2008 |
| JP | 2007-233597 | A | 9/2007 | WO | 2009/008296 | A1 | 1/2009 |
| JP | 2007-241789 | A | 9/2007 | WO | 2009/011144 | A1 | 1/2009 |
| JP | 2007-266999 | A | 10/2007 | WO | 2009/011376 | A1 | 1/2009 |
| JP | 2007-272264 | A | 10/2007 | WO | 2009/011400 | A1 | 1/2009 |
| JP | 2007-287128 | A | 11/2007 | WO | 2009/011423 | A1 | 1/2009 |
| JP | 2007-295557 | A | 11/2007 | WO | 2009/081719 | A1 | 7/2009 |
| JP | 2007-312350 | A | 11/2007 | WO | 2009/110381 | A1 | 9/2009 |
| JP | 2007-324865 | A | 12/2007 | WO | 2009/119548 | A1 | 10/2009 |
| JP | 2008-033716 | A | 2/2008 | WO | 2009/128437 | A1 | 10/2009 |
| JP | 2008-042910 | A | 2/2008 | WO | 2010/026939 | A1 | 3/2010 |
| JP | 2008-72243 | A | 3/2008 | | | | |
| JP | 2008-083867 | A | 4/2008 | | | | |
| JP | 2008-092131 | A | 4/2008 | | | | |
| JP | 2008-097426 | A | 4/2008 | | | | |
| JP | 2008-098993 | A | 4/2008 | | | | |
| JP | 4069958 | B2 | 4/2008 | | | | |
| JP | 2008-103691 | A | 5/2008 | | | | |
| JP | 2008-107947 | A | 5/2008 | | | | |
| JP | 2008-513888 | A | 5/2008 | | | | |
| JP | 2008-148345 | A | 6/2008 | | | | |
| JP | 2008-519347 | A | 6/2008 | | | | |
| JP | 2008-160874 | A | 7/2008 | | | | |
| JP | 2008-167190 | A | 7/2008 | | | | |
| JP | 2008-197714 | A | 8/2008 | | | | |
| JP | 2008-535372 | A | 8/2008 | | | | |
| JP | 2008-207875 | A | 9/2008 | | | | |
| JP | 2008-217406 | A | 9/2008 | | | | |
| JP | 2008-288915 | A | 11/2008 | | | | |
| JP | 2009-017284 | A | 1/2009 | | | | |
| JP | 2009-021970 | A | 1/2009 | | | | |

OTHER PUBLICATIONS

Kato et al.: "Wireless IC Device and Manufacturing Method Thereof," U.S. Appl. No. 12/432,854, filed Apr. 30, 2009.

Official communication issued in counterpart International Application No. PCT/JP2008/058168, mailed Aug. 12, 2008.

Official communication issued in counterpart International Application No. PCT/JP2008/062886, mailed Oct. 21, 2008.

Kato et al.: "Wireless IC Device," U.S. Appl. No. 12/469,896, filed May 21, 2009.

Ikemoto et al.: "Wireless IC Device," U.S. Appl. No. 12/496,709, filed Jul. 2, 2009.

Official communication issued in counterpart International Application No. PCT/JP2008/062947, mailed Aug. 19, 2008.

Official communication issued in counterpart International Application No. PCT/JP2008/056026, mailed Jul. 1, 2008.

Ikemoto et al.: "Wireless IC Device and Electronic Apparatus," U.S. Appl. No. 12/503,188, filed Jul. 15, 2009.

Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-to-Roll Process", Material Stage, Technical Information Institute Co., LTD, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.

Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material With Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2011/055344, mailed on Jun. 14, 2011.
Kubo et al.: "Antenna and Mobile Terminal"; U.S. Appl. No. 13/452,972, filed on Apr. 23, 2012.
Ikemoto: "RFID System"; U.S. Appl. No. 13/457,525, filed Apr. 27, 2012.
Ikemoto et al.: "Wireless IC Device and Electronic Apparatus"; U.S. Appl. No. 13/468,058, filed May 10, 2012.
Official Communication issued in International Patent Application No. PCT/JP2010/066291, mailed on Dec. 28, 2010.
Ikemoto: "Communication Terminal and Information Processing System"; U.S. Appl. No. 13/432,002, filed Mar. 28, 2012.
Official Communication issued in International Patent Application No. PCT/JP2010/070767, mailed on Feb. 22, 2011.
Ieki et al.: "Transceiver and Radio Frequency Identification Tag Reader"; U.S. Appl. No. 13/437,978, filed Apr. 3, 2012.
Official Communication issued in International Patent Application No. PCT/JP2011/065431, mailed on Oct. 18, 2011.
Kato et al.: "Wireless IC Device"; U.S. Appl. No. 13/470,486, filed May 14, 2012.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete""(All About Wireless IC Tags"), RFID, pp. 112-126.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.

Dokai et al.: "Optical Disc"; U.S. Appl. No. 12/326,916, filed Dec. 3, 2008.

Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.

Kato: "Wireless IC Device"; U.S. Appl. No. 11/964,185, filed Dec. 26, 2007.

Kato et al.: "Radio Frequency IC Device"; U.S. Appl. No. 12/336,629, filed Dec. 17, 2008.

Kato et al.: "Wireless IC Device and Component for Wireless IC Device"; U.S. Appl. No. 12/339,198, filed Dec. 19, 2008.

Ikemoto et al.: "Wireless IC Device"; U.S. Appl. No. 11/851,651, filed Sep. 7, 2007.

Kataya et al.: "Wireless IC Device and Electronic Device"; U.S. Appl. No. 11/851,661, filed Sep. 7, 2007.

Dokai et al.: "Antenna and Radio IC Device"; U.S. Appl. No. 12/350,307, filed Jan. 8, 2009.

* cited by examiner

WIRELESS COMMUNICATION DEVICE AND METAL ARTICLE

BACKGROUND OF THE INVENTION

1. Field of the Invention

The present invention relates to a wireless communication device and a metal article, and in particular, relates to a wireless communication device used for a RFID (Radio Frequency Identification) system and a metal article including the wireless communication device.

2. Description of the Related Art

In recent years, as an information management system for articles, there has been put into practical use an RFID system in which communication is established between a reader/writer generating an induction magnetic field and an RFID tag (also referred to as a wireless communication device) attached to an article on the basis of a non-contact method utilizing an electromagnetic field and predetermined information is transmitted. This RFID tag includes a wireless IC chip that stores therein the predetermined information and processes a predetermined wireless signal and an antenna (radiator) that transmits and receives a high-frequency signal.

As an RFID tag that is operable even if it is disposed in proximity to a metal plate, a metal-compatible tag described in Japanese Unexamined Patent Application Publication No. 2007-272264 is known. In this metal-compatible tag, a loop antenna conductor is wound around a plate-shaped dielectric member and an RFID chip is mounted in a gap portion formed in a portion of the loop antenna conductor. In addition, a gap is also formed on a surface side opposite to the chip mounting surface of the loop antenna conductor. When this metal-compatible tag is stuck to a metal plate, a high-frequency signal current flows in both the loop antenna conductor and the metal plate through capacitive coupling between the conductor of the back surface of the dielectric member and the metal plate.

In the metal-compatible tag, while a radiation gain on the front surface side (tag mounting surface) of the metal plate is secured to some extent, there is a problem that a radiation gain on the back surface side of the metal plate is small and a communication distance is short. That trend becomes more noticeable with an increase in the thickness of the metal plate, and, for example, it has been hard to use the metal-compatible tag for a metal article such as a stepladder, a building material, or the like.

SUMMARY OF THE INVENTION

Therefore, preferred embodiments of the present invention provide a wireless communication device and a metal article in which a radiation gain is large not only on a surface mounted to a metal plate or a metal member but also on a surface opposite to the mounting surface.

A wireless communication device according to a preferred embodiment of the present invention includes a wireless IC device that processes a high-frequency signal, a radiation conductor coupled to the wireless IC device, a ground conductor connected to the radiation conductor, and a metal plate that includes first and second main surfaces arranged such that the ground conductor is coupled to the first main surface and a portion that defines a radiation element, wherein the metal plate includes a current path portion arranged to conduct a high-frequency signal current on a first main surface side to a second main surface side when a high-frequency signal is supplied from the wireless IC device through the radiation conductor and the ground conductor.

According to a second preferred embodiment of the present invention, a metal article includes a wireless communication device and a metal member, wherein the wireless communication device includes a wireless IC device that processes a high-frequency signal, a radiation conductor coupled to the wireless IC device, and a ground conductor connected to the radiation conductor, wherein the metal member includes first and second main surfaces, the ground conductor is coupled to the first main surface, and the metal member includes a current path portion arranged to conduct a high-frequency signal current on a first main surface side to a second main surface side when a high-frequency signal is supplied from the wireless IC device through the radiation conductor and the ground conductor.

In the wireless communication device, since the high-frequency signal current on the first surface side (the mounting surface side of the wireless communication device) of the metal plate or the metal member is conducted to the second surface side through the current path portion, a radiation gain becomes large not only on the first surface side of the metal plate or the metal member but also on the second surface side. Therefore, it is possible to secure a communication distance not only on the first surface side but also on the second surface side.

According to various preferred embodiments of the present invention, a radiation gain becomes large not only on a surface mounted to a metal plate or a metal member but also on a surface opposite to the mounting surface.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1A and 1B illustrate a stepladder as a metal article equipped with a wireless communication device, wherein FIG. 1A is a perspective view, and FIG. 1B is a back surface view in a folding state.

FIGS. 2A-2C illustrate a wireless communication device according to a preferred embodiment of the present invention, wherein FIG. 2A is a plan view, FIG. 2B is a cross-sectional view, and FIG. 2C is a bottom view.

FIGS. 5A and 5B are explanatory diagrams illustrating a directivity and a gain, wherein FIG. 5A illustrates a preferred embodiment of the present invention, and FIG. 5B illustrates a comparative example.

FIGS. 10A-10C illustrate a wireless communication device according to another preferred embodiment of the present invention, wherein FIG. 10A is a plan view, FIG. 10B is a cross-sectional view, and FIG. 10C is a bottom view.

FIGS. 11A-11C illustrate a wireless communication device according to a further preferred embodiment of the present invention, wherein FIG. 11A is a cross-sectional view, FIG. 11B is an operating principle explanatory diagram, and FIG. 11C is a perspective view of a radiation conductor and a ground conductor.

FIGS. 12A-12C illustrate a wireless communication device according to yet another preferred embodiment of the present invention, wherein FIG. 12A is a perspective view, FIG. 12B is a cross-sectional view, and FIG. 12C is a perspective view of a radiation conductor and a ground conductor.

FIGS. 13A-13C illustrate a wireless communication device according to an additional preferred embodiment of the present invention, wherein FIG. 13A is a plan view, FIG. 13B is a cross-sectional view, and FIG. 13C is a perspective view of a radiation conductor and a ground conductor.

FIGS. 14A and 14B illustrate a wireless communication device according to another preferred embodiment of the present invention, wherein FIG. 14A is a cross-sectional view, and FIG. 14B is an operating principle explanatory diagram.

DETAILED DESCRIPTION OF THE PREFERRED EMBODIMENTS

Hereinafter, preferred embodiments of a wireless communication device and a metal article according to the present invention will be described with reference to attached drawings. In addition, in each drawing, the same symbols are assigned to a common component and a common portion, and the redundant descriptions thereof will be omitted.

Figure 1A:
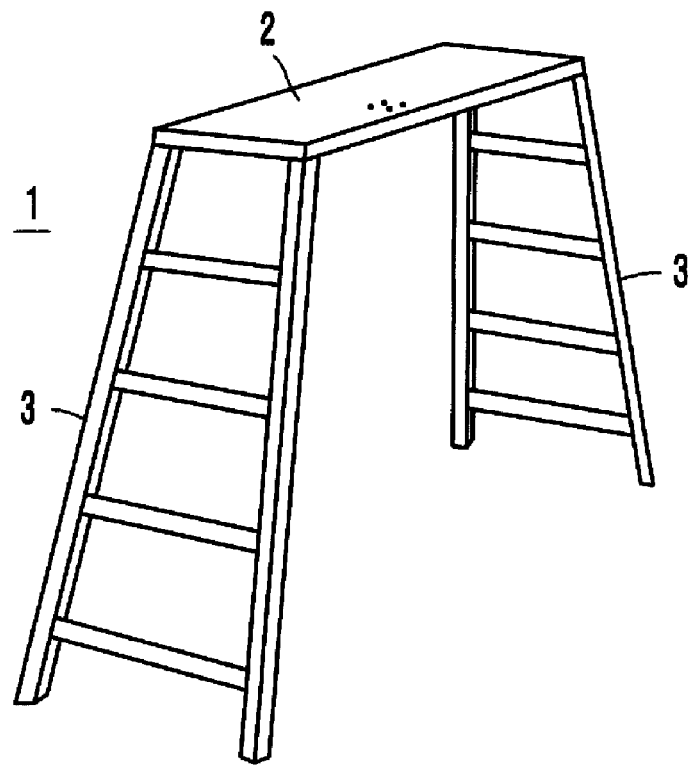
Figure 1B:
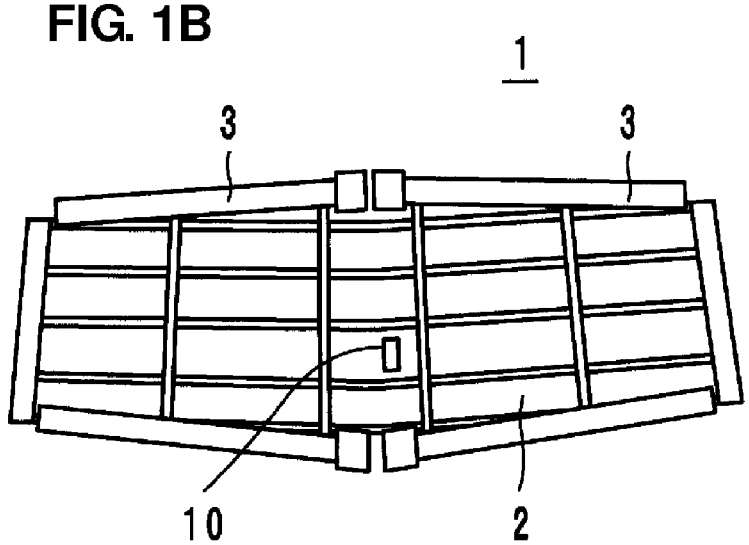

A stepladder 1 illustrated in FIGS. 1A and 1B is a non-limiting example of a building metal article, and includes a top board portion 2 and a foldable leg portion 3. A wireless communication device 10 is firmly attached to the back side of the top board portion 2 with being stuck and crimped thereto, for example. As described later according to a first preferred embodiment to a ninth preferred embodiment of the present invention, the wireless communication device 10 communicates with a reader/writer of an RFID system, and performs information management for the stepladder 1. In addition, a portion of the top board portion (metal plate) 2 functions as a radiation element of the wireless communication device 10. Hereinafter, the wireless communication device 10 will be described in detail.

First Preferred Embodiment

Figure 2A:
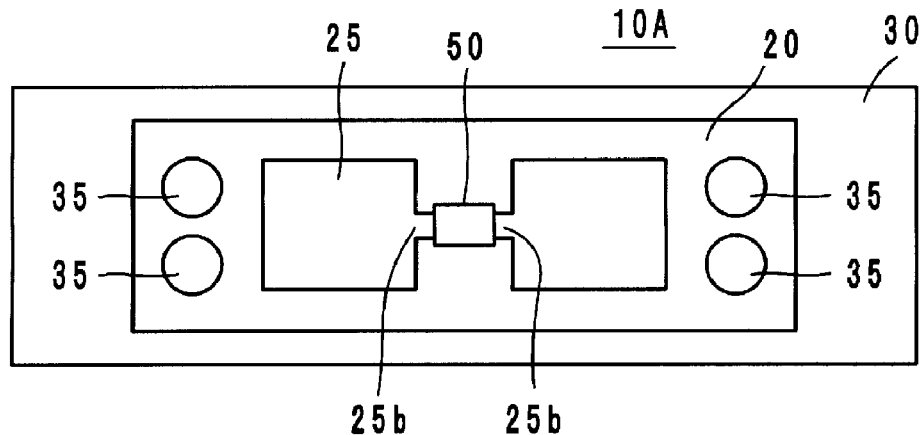
Figure 2B:
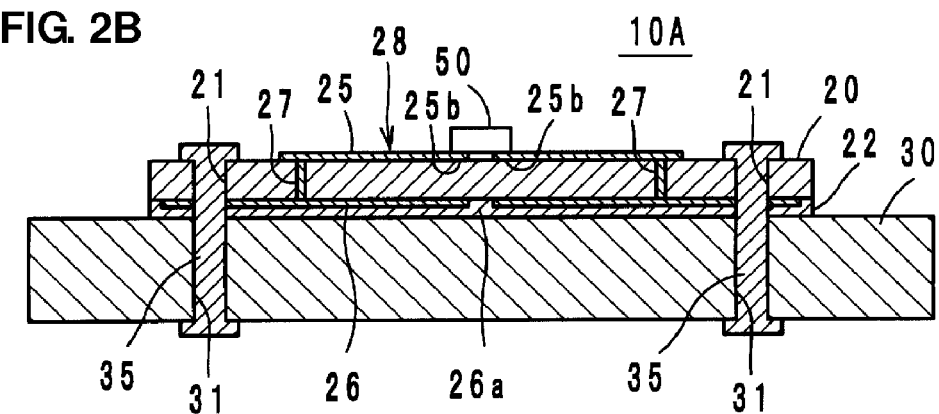
Figure 2C:
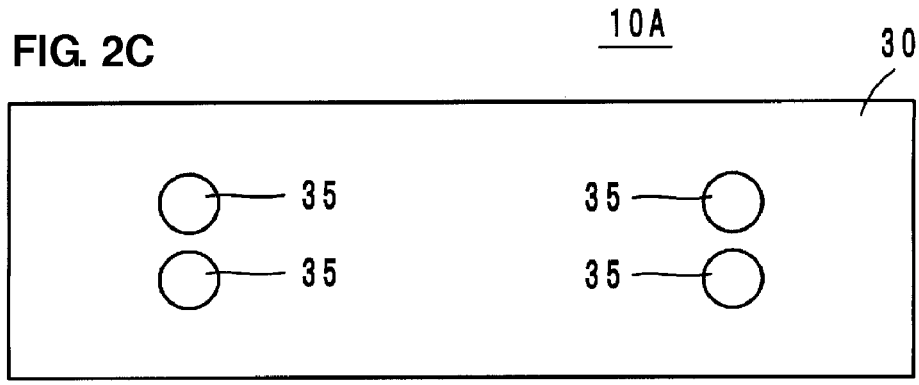

A wireless communication device 10A according to a first preferred embodiment is preferably used for the communication of a UHF band, and includes a wireless IC device 50, a dielectric substrate 20, and a metal plate 30, as illustrated in FIGS. 2A-2C. The wireless IC device 50 processes a high-frequency signal, and the detail thereof will be described in detail later with reference to FIG. 6 to FIG. 9. The dielectric substrate 20 includes thermosetting resin such as epoxy resin or the like, thermoplastic resin such as polyimide or the like, or ceramic such as LTCC or the like (may be a magnetic material), and is preferably configured as a single-layer substrate or a multilayer substrate, for example. For example, the metal plate 30 is the top board portion 2 of the stepladder 1.

Figure 3:
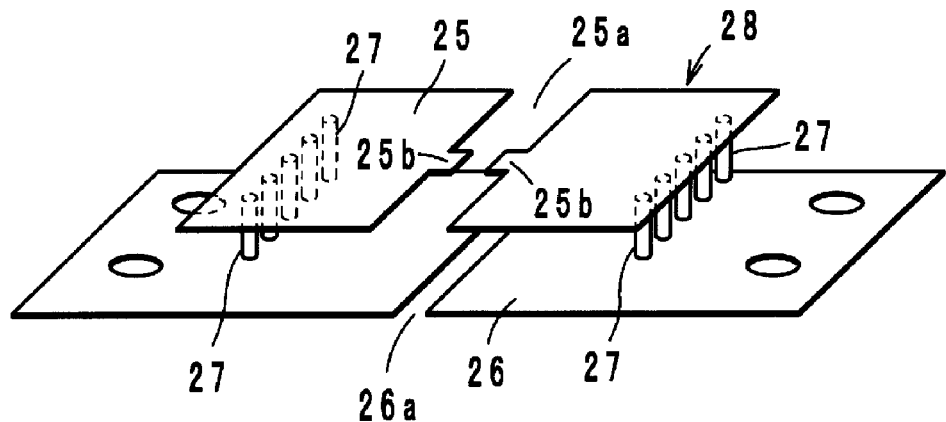
FIG. 3 is a perspective view illustrating a radiation conductor and a ground conductor included in a wireless communication device according to a preferred embodiment of the present invention.

The dielectric substrate 20 preferably has a rectangular parallelepiped shape including a first surface (front surface) and a second surface (back surface), a radiation conductor 25 is provided on the front surface, and a ground conductor 26 is provided on the back surface. As illustrated in FIG. 3, the radiation conductor 25 and the ground conductor 26 are electrically connected to each other through a plurality of interlayer connection conductors (via hole conductors) 27 provided in the dielectric substrate 20. The radiation conductor 25 and the ground conductor 26 preferably are defined by thin-film conductor patterns including metal foils such as copper, aluminum, or the like, or alternatively, are preferably defined by thick-film conductor patterns that include conductive paste containing powder made of silver, copper, or the like.

The radiation conductor 25 and the ground conductor 26 are separated from each other by gaps 25a and 26a in the center portion of the dielectric substrate 20. A projecting power feeding portion 25b is located in the gap 25a in the radiation conductor 25, and the wireless IC device 50 is coupled to the power feeding portion 25b. This coupling is electromagnetic field coupling or electrical direct coupling (DC connection).

In each of the dielectric substrate 20 and the metal plate 30, through holes 21 and 31 are formed to penetrate from the front thereof to the back thereof. The back surface of the dielectric substrate 20 is caused to adhere to the front surface of the metal plate 30 through insulating adhesive 22, for example. Furthermore, a conductive members 35 inserted into the through holes 21 and 31 is individually crimped at the front surface portion of the dielectric substrate 20 and the back surface portion of the metal plate 30, and hence the dielectric substrate 20 is firmly fixed to the metal plate 30. This conductive member 35 defines a current path portion electrically conducting the front surface and back surface of the metal plate 30 to each other. Furthermore, the conductive member 35 is also electrically conducted to the ground conductor 26. It is preferable that the conductive member 35 is made of a material having the same electrical conductivity as or a higher electrical conductivity than the electrical conductivity of the metal plate 30.

A loop-shaped electrode 28 is disposed in the dielectric substrate 20 (refer to FIG. 2B). More specifically, the loop-shaped electrode 28 includes the radiation conductor 25, the ground conductor 26, and the plural interlayer connection conductors 27 starting from the power feeding portion 25b, and is capacitively coupled at the gap 26a portion. Namely, the ground electrode 26 is capacitively coupled at the gap 26a portion through the metal plate 30. In this loop-shaped electrode 28, a loop plane that is the circling plane thereof is disposed so as to be perpendicular or substantially perpendicular to the front surface of the metal plate 30. Since the gap 26a portion is included, when, for example, the dielectric substrate 20 preferably is formed using flexible material, it is easy to cause the dielectric substrate 20 to bend.

Figure 4:
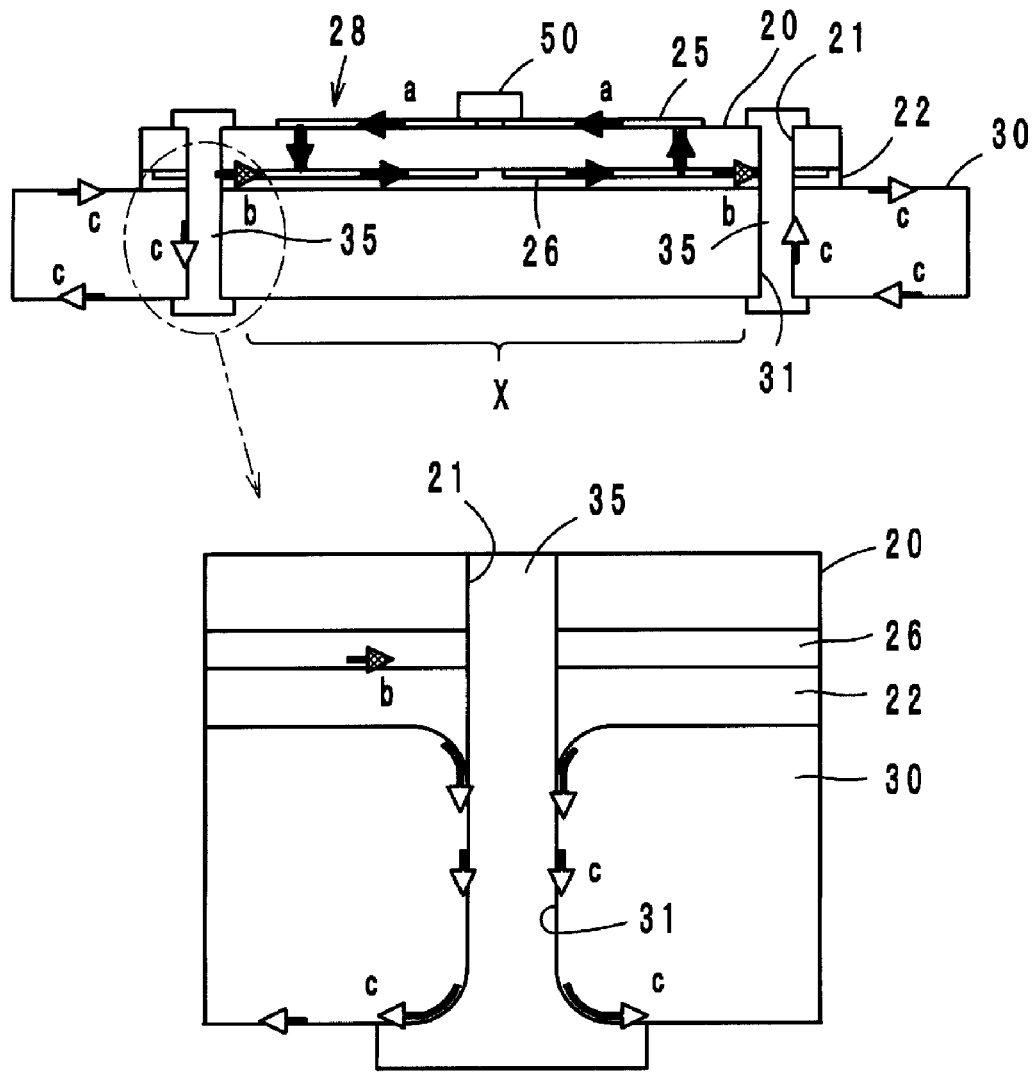
FIG. 4 is an explanatory diagram illustrating an operating principle of the wireless communication device according to a preferred embodiment of the present invention.

In the wireless communication device 10A having the above-described configuration, when a predetermined high-frequency signal is transmitted from the wireless IC device 50, a high-frequency signal current a flows along the loop-shaped electrode 28, as illustrated in FIG. 4. In addition, a high-frequency signal current b is excited to flow by the high-frequency signal current a, in a portion located outside of the interlayer connection conductor 27 of the ground conductor 26. Owing to this high-frequency signal current b, a high-frequency signal current c flows in a region in the proximity of a surface boundary between the conductive member 35 and the metal plate 30. More specifically, the high-frequency signal current a flowing through the ground conductor 26 is conducted to the back surface side of the metal plate 30 with the surface boundary portion between the conductive member 35 and the metal plate 30 serving as a current path portion.

Figure 5A:
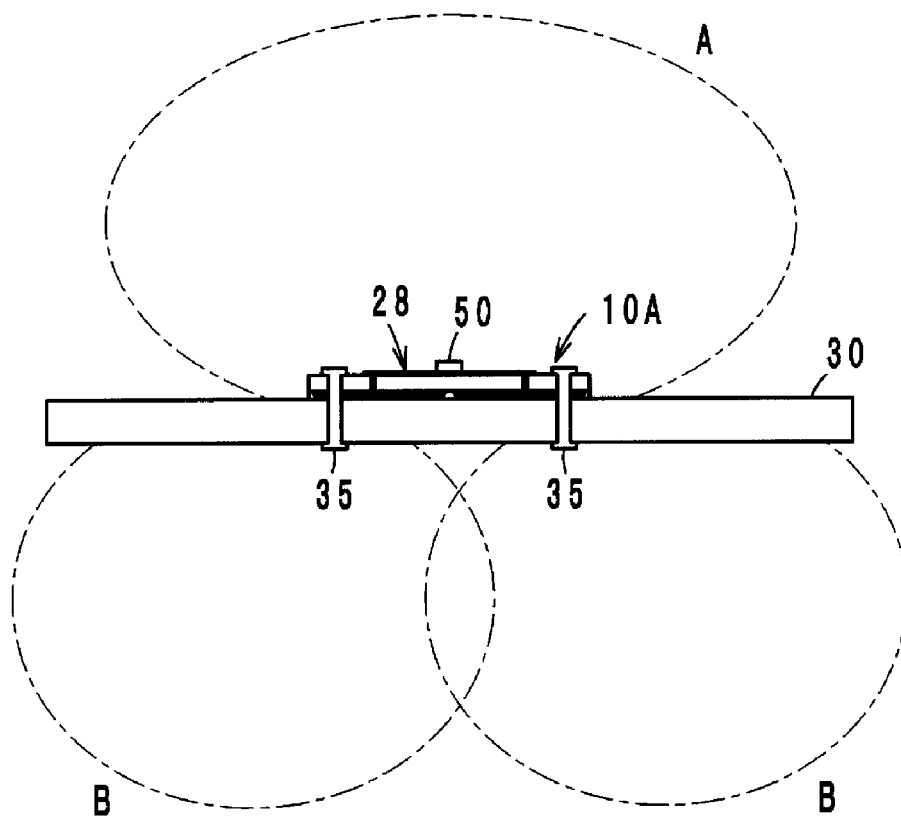

As a result, as illustrated in FIG. 5A, not only the radiation A of the high-frequency signal from the radiation conductor 25 to the front surface side of the metal plate 30 occurs but also the radiation B of the high-frequency signal to the back surface side of the metal plate 30 occurs. More specifically, it is possible to establish communication with the reader/writer from the front and back surfaces of the metal plate 30. A high-frequency signal radiated from the reader/writer in the RFID system and received by the metal plate 30 is supplied to the wireless IC device 50 through the surface boundary portion between the conductive member 35 and the metal plate 30 and the loop-shaped electrode 28, and the wireless IC device 50 operates. On the other hand, a response signal from the wireless IC device 50 is transmitted to the metal plate 30 through the loop-shaped electrode 28 and the surface boundary portion, and radiated to the reader/writer.

Figure 5B:
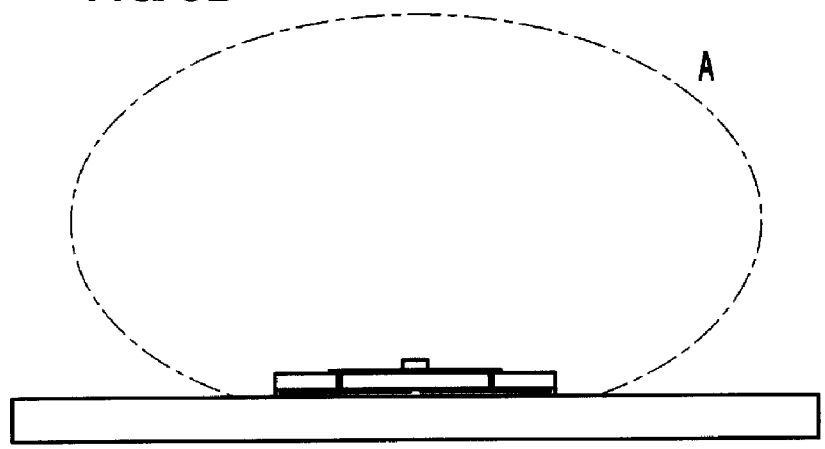

Incidentally, in a comparative example not including the conductive member 35, since no high-frequency signal current is transmitted between the loop-shaped electrode 28 and the back surface of the metal plate 30, the radiation A from the radiation conductor 25 only occurs, as illustrated in FIG. 5B, and no radiation occurs from the back surface of the metal plate 30.

The loop-shaped electrode 28 causes the wireless IC device 50 and the metal plate 30 to be coupled to each other, and functions as an impedance matching circuit. It is possible for the loop-shaped electrode 28 to perform impedance matching by adjusting the electrical length thereof or the like. In addition, since the loop plane of the loop-shaped electrode 28 is disposed so as to be perpendicular or substantially perpendicular to the front surface of the metal plate 30, a magnetic field is generated with respect to the front surface of the metal plate 30. Accordingly, an electric field is induced perpendicular or substantially perpendicular to the metal plate 30, a magnetic field loop is induced owing to this electric field loop, and an electromagnetic field distribution spreads due to the concatenation thereof. With this unique configuration, it is possible to realize a wireless communication device including the metal plate 30.

As illustrated in FIG. 4, it is desirable that roundness is assigned to the inner peripheral surfaces of the through holes 31 of the metal plate 30, specifically, ridge line portions in which the through holes 31 open on the front and back surfaces of the metal plate 30. This is because the high-frequency signal current c smoothly flows. In addition, it is desirable that the thickness of the metal plate 30 ranges from about 0.005 to about 0.5 times as thick as the wavelength of the high-frequency signal. More specifically, when the high-frequency signal is in a 900 MHz band, the thickness preferably is about from about 0.8 mm to about 8 cm, for example. Depending on the material (electrical conductivity) of the metal plate 30, if the thickness is within this range, it is also possible to obtain a desirable radiation gain on the back surface side of the metal plate 30.

Figure 6:
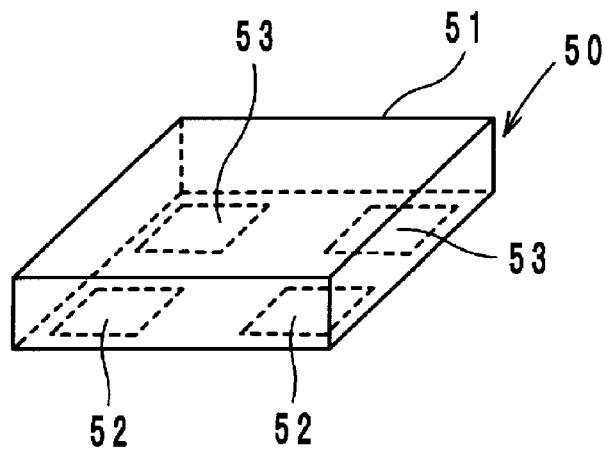
FIG. 6 is a perspective view illustrating a wireless IC chip defining a wireless IC device.
Figure 7:
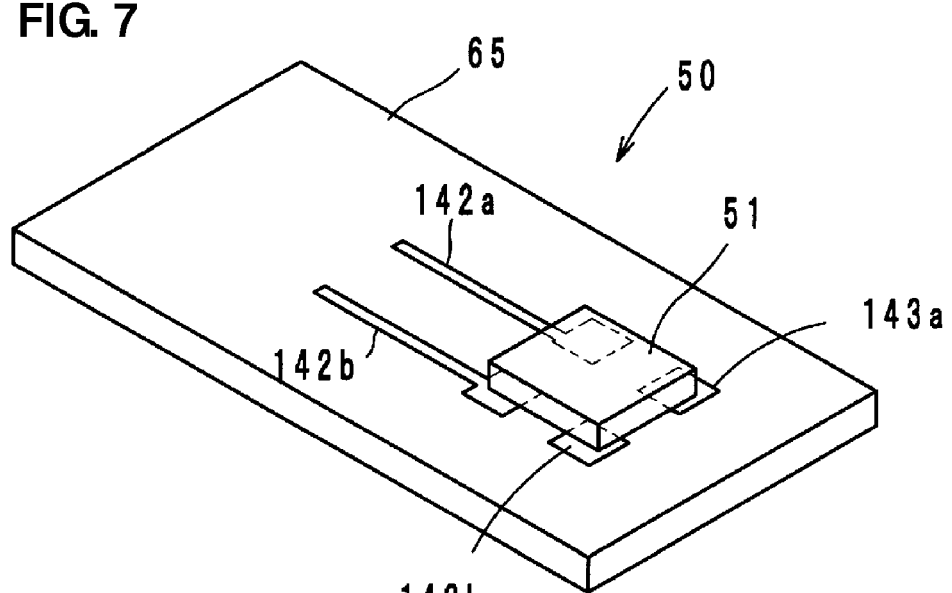
FIG. 7 is a perspective view illustrating a state in which the wireless IC chip is mounted, as the wireless IC device, on a feed circuit substrate.
Figure 8:
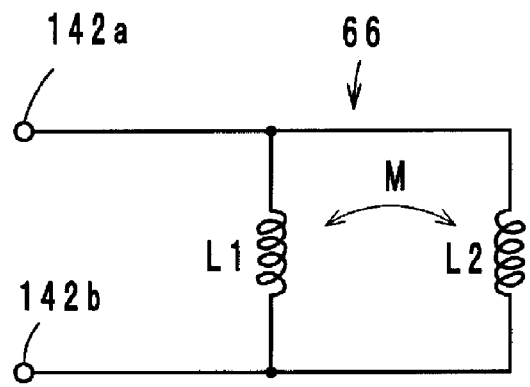
FIG. 8 is an equivalent circuit diagram illustrating an example of a feed circuit.

As illustrated in FIG. 6, the wireless IC device 50 may be a wireless IC chip 51 processing a high-frequency signal, or alternatively, as illustrated in FIG. 7, the wireless IC device 50 may also be configured to include the wireless IC chip 51 and a feed circuit substrate 65 including a resonant circuit having a predetermined resonance frequency.

The wireless IC chip 51 illustrated in FIG. 6 includes a clock circuit, a logic circuit, a memory circuit, and the like, and necessary information is stored therein. On the back surface of the wireless IC chip 51, input-output-use terminal electrodes and 52 and mount-use terminal electrodes 53 and 53 are provided. The input-output-use terminal electrodes 52 and 52 are electrically connected to the power feeding portions 25b and 25b illustrated in the first preferred embodiment, through metal bumps or the like. In addition, as the material of the metal bump, Au, solder, or the like may be used.

As illustrated in FIG. 7, when the wireless IC device 50 is configured to include the wireless IC chip 51 and the feed circuit substrate 65, it is possible to provide various kinds of feed circuits (a resonant circuit/a matching circuit are included) in the feed circuit substrate 65. For example, as illustrated as an equivalent circuit in FIG. 8, there may be adopted a feed circuit 66 including inductance elements L1 and L2 that have inductance values different from each other and are subjected to magnetic coupling (indicated by mutual inductance M) with the phases thereof being opposite to each other. The feed circuit 66 has a predetermined resonance frequency, and establishes impedance matching between the impedance of the wireless IC chip 51 and the metal plate 30. In addition, the wireless IC chip 51 and the feed circuit 66 may be electrically connected (DC-connected) to each other, or may be coupled to each other through an electromagnetic field.

The feed circuit 66 transmits, to the metal plate 30, a high-frequency signal that is sent out from the wireless IC chip 51 and has a predetermined frequency, through the loop-shaped electrode 28, and supplies, to the wireless IC chip 51, a high-frequency signal received by the metal plate 30, through the loop-shaped electrode 28. Since the feed circuit 66 has a predetermined resonance frequency, it is easy to establish impedance matching with the metal plate 30, and it is possible to shorten the electrical length of the loop-shaped electrode 28.

Next, the configuration of the feed circuit substrate 65 will be described. As illustrated in FIG. 6 and FIG. 7, the input-output-use terminal electrode 52 of the wireless IC chip 51 is connected to feed terminal electrodes 142a and 142b located on the feed circuit substrate 65 and the mount-use terminal electrode 53 is connected to mounting terminal electrodes 143a and 143b, through metal bumps or the like.

Figure 9:
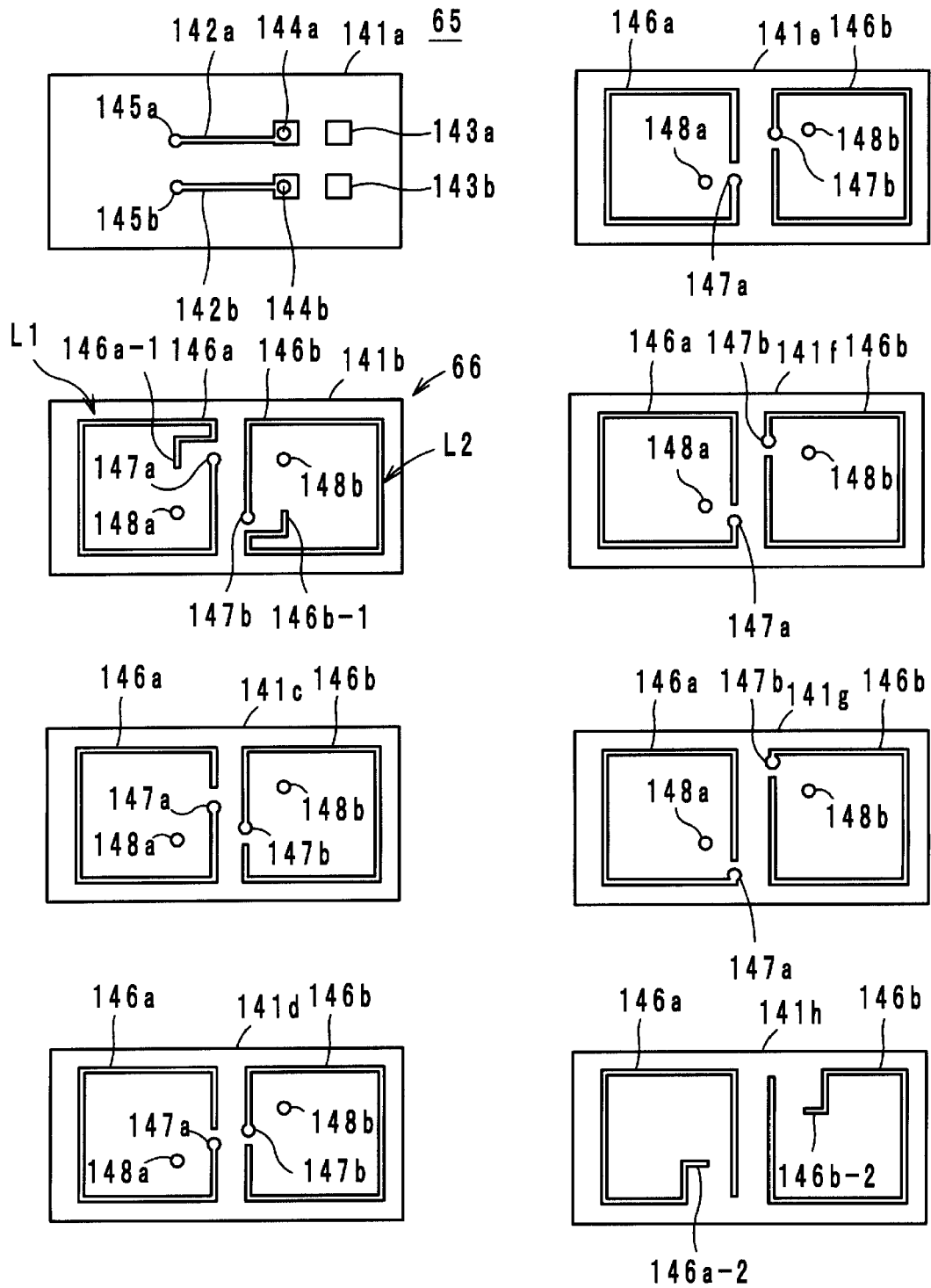
FIG. 9 is a plan view illustrating a laminated structure of the feed circuit substrate.

As illustrated in FIG. 9, the feed circuit substrate 65 is preferably obtained by laminating, crimping, and firing ceramic sheets 141a to 141h including dielectric material or magnetic material. In this regard, however, insulation layers configuring the feed circuit substrate 65 are not limited to the ceramic sheets, and, for example, the insulation layers may be resin sheets such as thermosetting resin such as liquid crystal polymer or the like or thermoplastic resin. On the sheet 141a serving as an uppermost layer, the feed terminal electrodes 142a and 142b, the mounting terminal electrodes 143a and 143b, and via hole conductors 144a, 144b, 145a, and 145b are provided. On each of the sheets 141b to 141h serving as a second layer to an eighth layer, wiring electrodes 146a and 146b configuring the inductance elements L1 and L2 are provided, and via hole conductors 147a, 147b, 148a, and 148b are provided as necessary.

By laminating the sheets 141a to 141h, the inductance element L1 is provided such that the wiring electrode 146a is connected in a spiral shape through the via hole conductor 147a and the inductance element L2 is provided such that the wiring electrode 146*b* is connected in a spiral shape through the via hole conductor 147*b*. In addition, capacitance is generated between the lines of the wiring electrodes 146*a* and 146*b*.

The end portion 146*a*-1 of the wiring electrode 146*a* on the sheet 141*b* is connected to the feed terminal electrode 142*a* through the via hole conductor 145*a*, and the end portion 146*a*-2 of the wiring electrode 146*a* on the sheet 141*h* is connected to the feed terminal electrode 142*b* through the via hole conductors 148*a* and 145*b*. The end portion 146*b*-1 of the wiring electrode 146*b* on the sheet 141*b* is connected to the feed terminal electrode 142*b* through the via hole conductor 144*b*, and the end portion 146*b*-2 of the wiring electrode 146*b* on the sheet 141*h* is connected to the feed terminal electrode 142*a* through the via hole conductors 148*b* and 144*a*.

In the above-mentioned feed circuit 66, since the inductance elements L1 and L2 are individually wound in directions opposite to each other, magnetic fields occurring in the inductance elements L1 and L2 are cancelled out. Since the magnetic fields are cancelled out, it is necessary to lengthen the wiring electrodes 146*a* and 146*b* to some extent, in order to obtain a desired inductance value. Accordingly, since a Q-value is lowered, the steepness of a resonance characteristic disappears and the resonance characteristic has a wider bandwidth in the vicinity of a resonance frequency.

When the perspective plane of the feed circuit substrate 65 is viewed, the inductance elements L1 and L2 are located at right and left different positions. In addition, the directions of magnetic fields occurring in the inductance elements L1 and L2 are opposite to each other. Accordingly, when the feed circuit 66 is caused to be coupled to the loop-shaped electrode 28, a reversed current is excited in the loop-shaped electrode 28 to enable a current to occur in the metal plate 30, and owing to a potential difference due to this current, it is possible to cause the metal plate 30 to operate as a radiation element (antenna).

By embedding a resonance/matching circuit into the feed circuit substrate 65, it is possible to suppress and prevent a characteristic fluctuation due to the influence of an external article, and it is possible to avoid the degradation of communication quality. In addition, when the wireless IC chip 51 configuring the wireless IC device 50 is disposed so as to be directed toward a central side in the thickness direction of the feed circuit substrate 65, it is possible to avoid the destruction of the wireless IC chip 51, and it is possible to improve a mechanical strength as the wireless IC device 50.

Second Preferred Embodiment

Figure 10A:
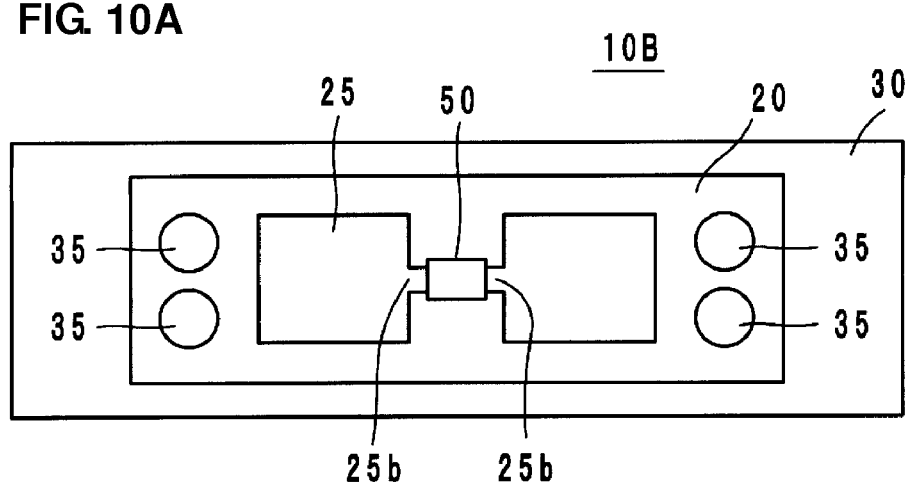
Figure 10B:
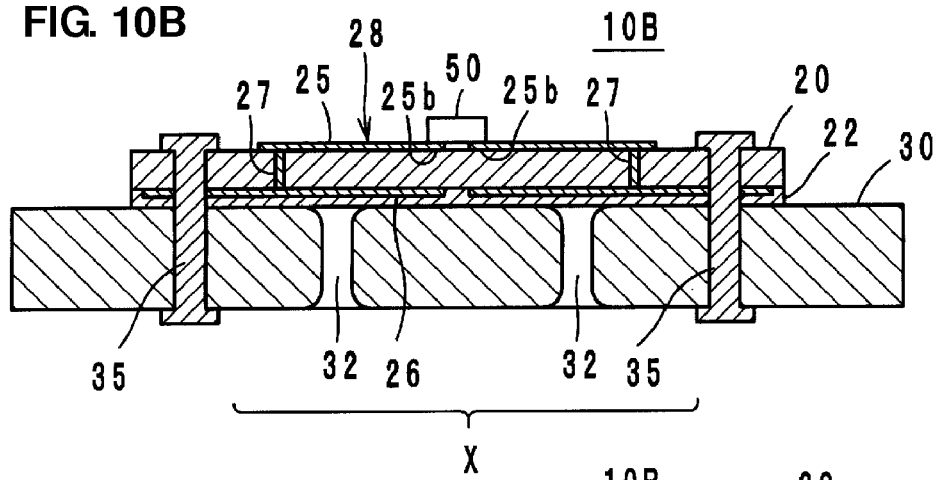
Figure 10C:
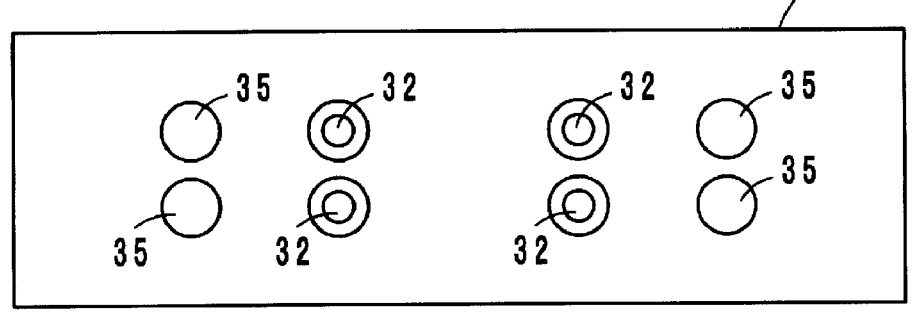

As illustrated in FIGS. 10A-10C, in a wireless communication device 10B according to a second preferred embodiment, through holes 32, which penetrate from a front surface to a back surface, are formed in a portion of the metal plate 30, located directly below the ground conductor 26. The other configuration is preferably the same or substantially the same as in the first preferred embodiment. In the present second preferred embodiment, the inner peripheral surface of the through hole 32 is also used as a current path portion.

More specifically, in the first preferred embodiment, since, in a region X (refer to FIG. 4) between the conductive members 35 on the back surface of the metal plate 30, a current flows whose direction is opposite to the direction of the current flowing through the loop-shaped electrode 28, it is hard for a high-frequency signal current to flow, and it is hard for a high-frequency signal to be radiated from the region X. On the other hand, in the present second preferred embodiment, since the through holes 32 are located in the region X, a high-frequency signal current flowing along the front surface of the metal plate 30 is conducted to the back surface along the inner peripheral surfaces of the through holes 32. Accordingly, since, from among the region X, a region is narrowed in which it is hard for the high-frequency signal current to flow, and a region is increased in which the high-frequency signal current flows (namely, the high-frequency signal current flows in the central portion of the region X), it is possible to cause a radiation characteristic to be improved.

In addition, since the high-frequency signal current propagates in the surface layer region of the metal plate 30, this through hole 32 may be filled with conductive material or insulating material. In addition, in the same way as described above, it is desirable that roundness is assigned to ridge line portions in which the through holes 32 open on the front and back surfaces of the metal plate 30.

Third Preferred Embodiment

Figure 11A:
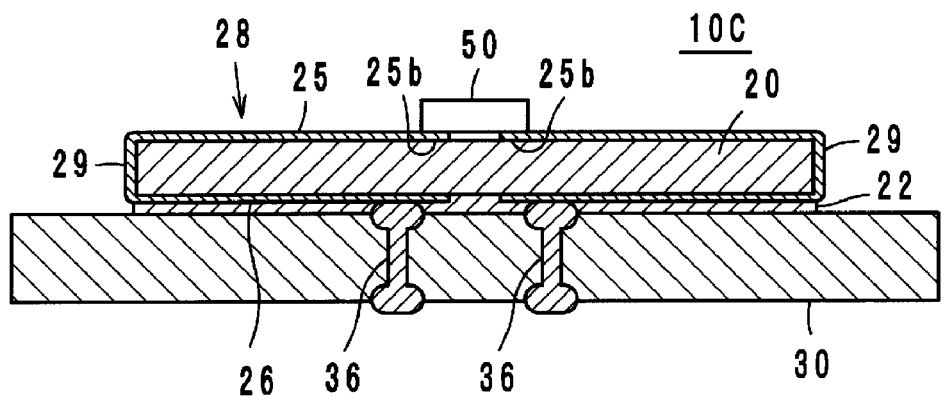
Figure 11B:
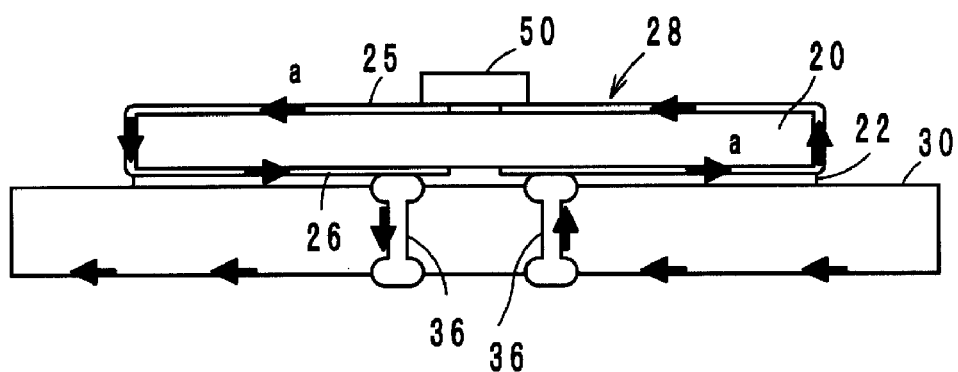
Figure 11C:
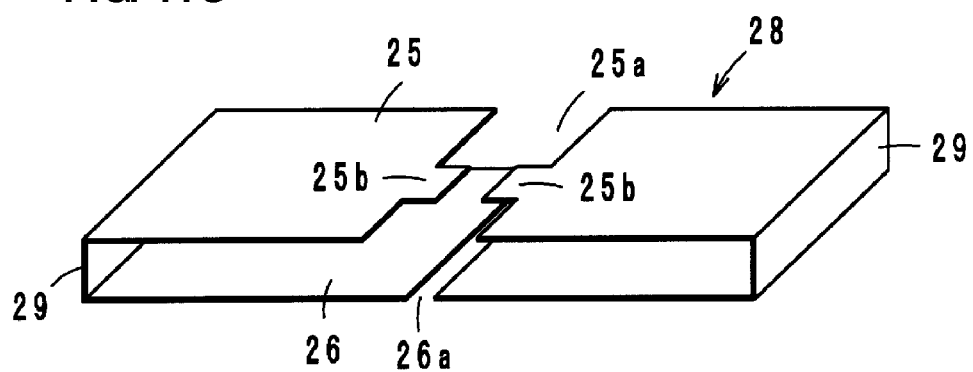

As illustrated in FIGS. 11A-11C, in a wireless communication device 10C according to a third preferred embodiment of the present invention, the radiation conductor 25 provided on the front surface of the dielectric substrate 20 and the ground conductor 26 provided on the back surface thereof are connected to each other using interlayer connection conductors 29 located on the end surfaces of the dielectric substrate 20, thereby defining the loop-shaped electrode 28. Furthermore, in the metal plate 30, the conductive members 36 are arranged to electrically conduct the front and back surfaces thereof to each other and are also electrically conducted to the ground conductor 26. In the present third preferred embodiment, a high-frequency signal transmitted from the wireless IC device 50 flows, as the high-frequency signal current a, along the loop-shaped electrode 28, and is conducted to the back surface of the metal plate 30 along the conductive member 36, and a high-frequency signal is radiated from the back surface side.

In the present preferred embodiment, compared with the first preferred embodiment, since it is possible to shorten a distance between the conductive members 36, it is possible to improve a radiation efficiency by narrowing a region in which it is hard for the high-frequency signal to be radiated.

Fourth Preferred Embodiment

Figure 12A:
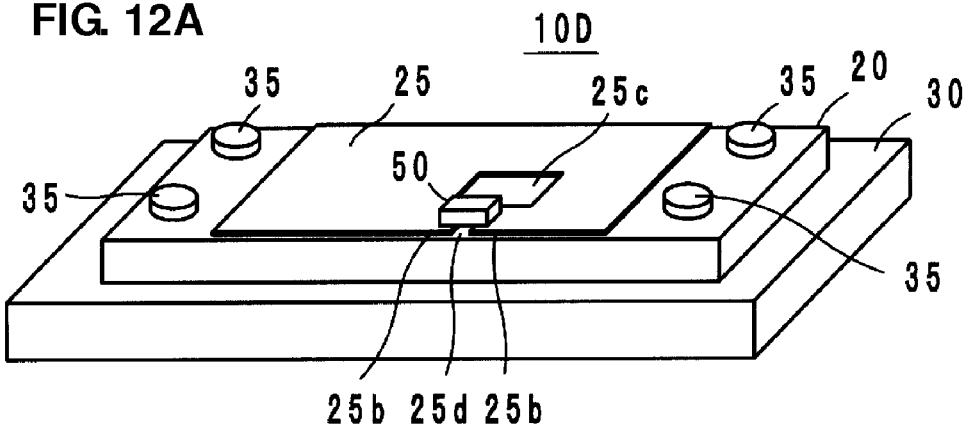
Figure 12B:
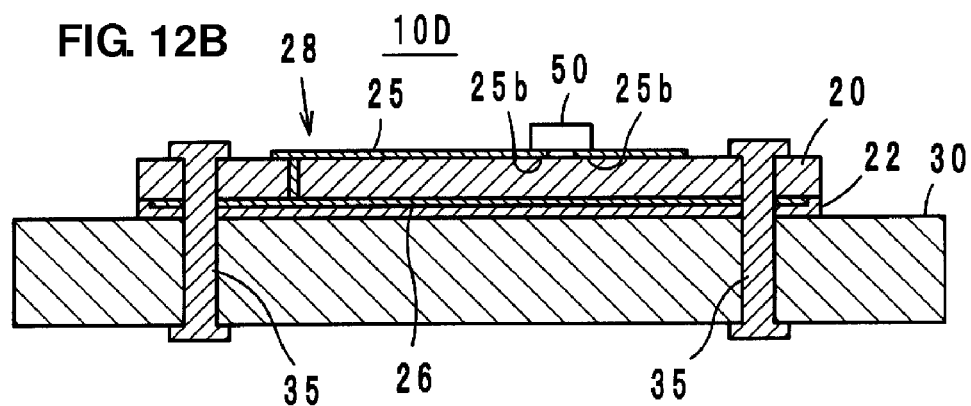
Figure 12C:
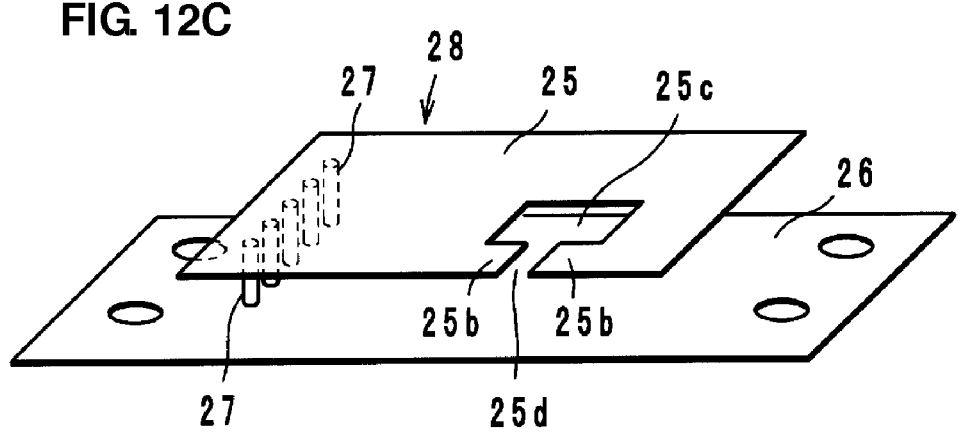

As illustrated in FIGS. 12A-12C, in a wireless communication device 10D according to a fourth preferred embodiment of the present invention, an aperture portion 25*c* and a slit 25*d* are disposed in the radiation conductor 25 provided on the front surface of the dielectric substrate 20, and a power feeding portion 25*b* is formed through the slit 25*d*. The ground conductor 26 provided on the back surface of the dielectric substrate 20 is a sheet of conductor (the gap 26*a* is not formed), and is electrically connected to the radiation conductor 25 by the plural interlayer connection conductors 27, thereby defining the loop-shaped electrode 28. The conductive member defines a device to conduct the high-frequency signal current from the front surface of the metal plate 30 to the back surface thereof, in the same way as in the first preferred embodiment.

In the fourth preferred embodiment, the high-frequency signal transmitted from the wireless IC device 50 flows along the periphery of the aperture portion 25*c*, and the periphery of the aperture portion 25*c* functions as a magnetic field antenna. Accordingly, the radiation conductor 25 has a potential difference with respect to the ground conductor 26, and the radiation conductor 25 functions as a patch antenna with the ground conductor 26 serving as a ground electrode. According to such a simple configuration, it is also possible to realize a wireless communication device including the metal plate 30. As described in the above-mentioned first preferred embodiment, a high-frequency signal is also radiated from the back surface side of the metal plate 30 connected to the ground conductor 26.

Fifth Preferred Embodiment

Figure 13A:
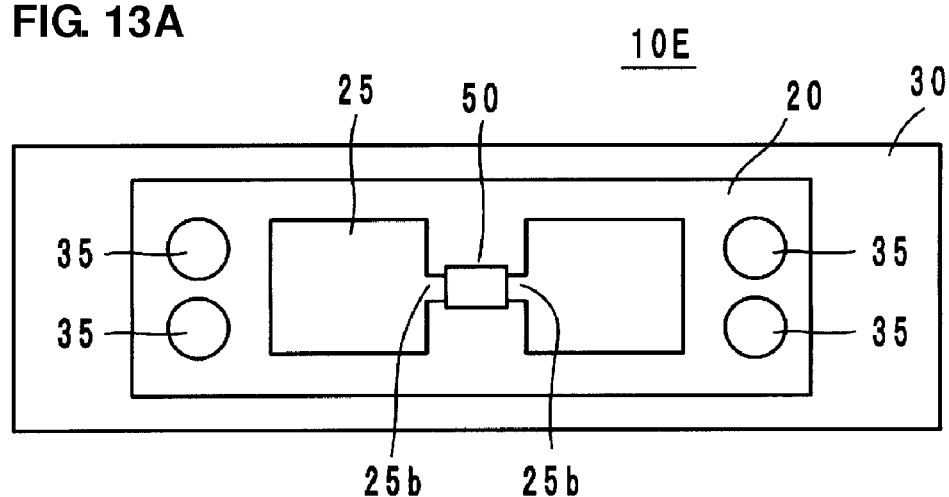
Figure 13B:
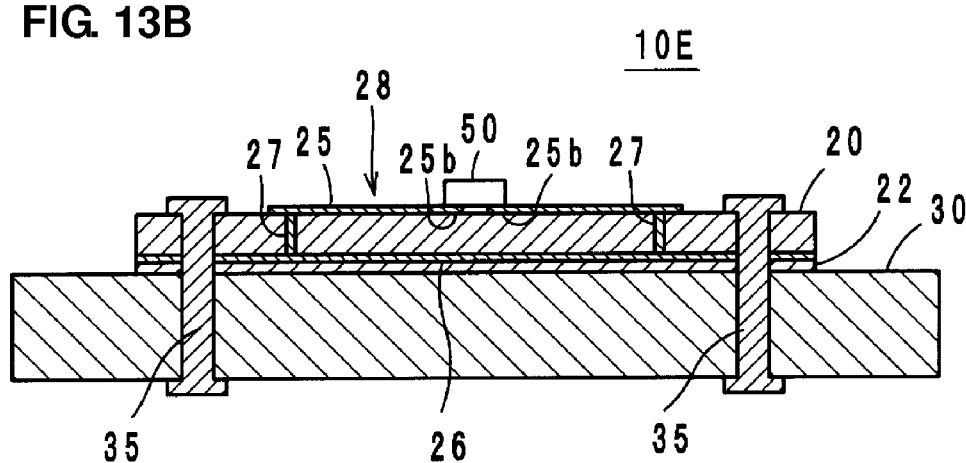
Figure 13C:
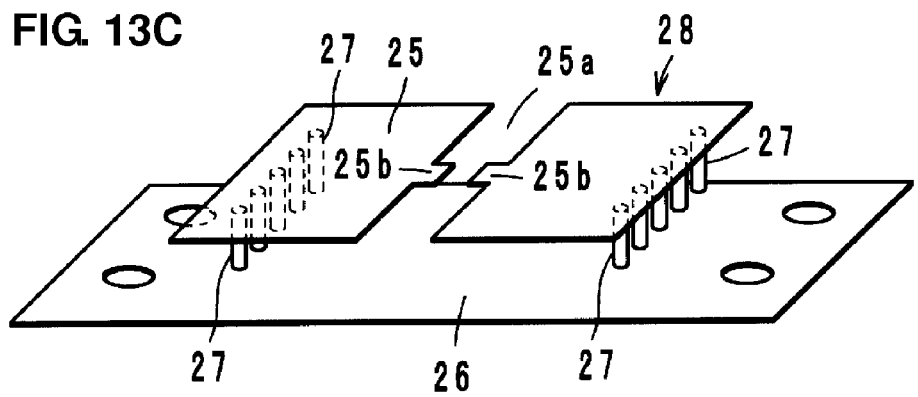

As illustrated in FIGS. 13A-13C, in a wireless communication device 10E according to a fifth preferred embodiment, the ground conductor 26 is embedded in the interlayer of the dielectric substrate 20, both end portions thereof are caused to be exposed from both end surfaces of the dielectric substrate 20, and the ground conductor 26 is a sheet of conductor (the gap 26a is not formed). The other configuration in the present fifth preferred embodiment is preferably the same as in the first preferred embodiment, and the radiation state of the high-frequency signal is also the same as in the first preferred embodiment. In particular, in the present fifth preferred embodiment, since the ground conductor 26 is embedded in the dielectric substrate 20, the insulating adhesive 22 is not used when the dielectric substrate 20 is attached to the metal plate 30, and it is possible to directly crimp the dielectric substrate 20 using the conductive member 35. In addition, since both end portions of the ground conductor 26 are exposed from both end surfaces of the dielectric substrate 20, a high-frequency signal current flowing along the front surface of the metal plate 30 is increased.

Sixth Preferred Embodiment

Figure 14A:
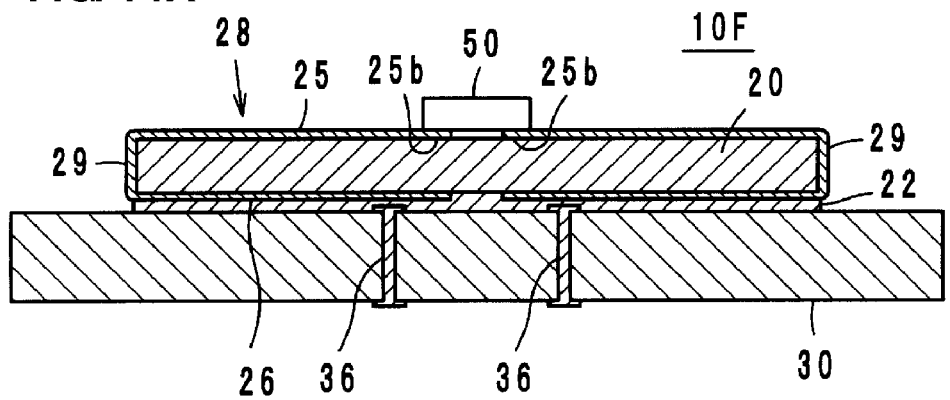
Figure 14B:
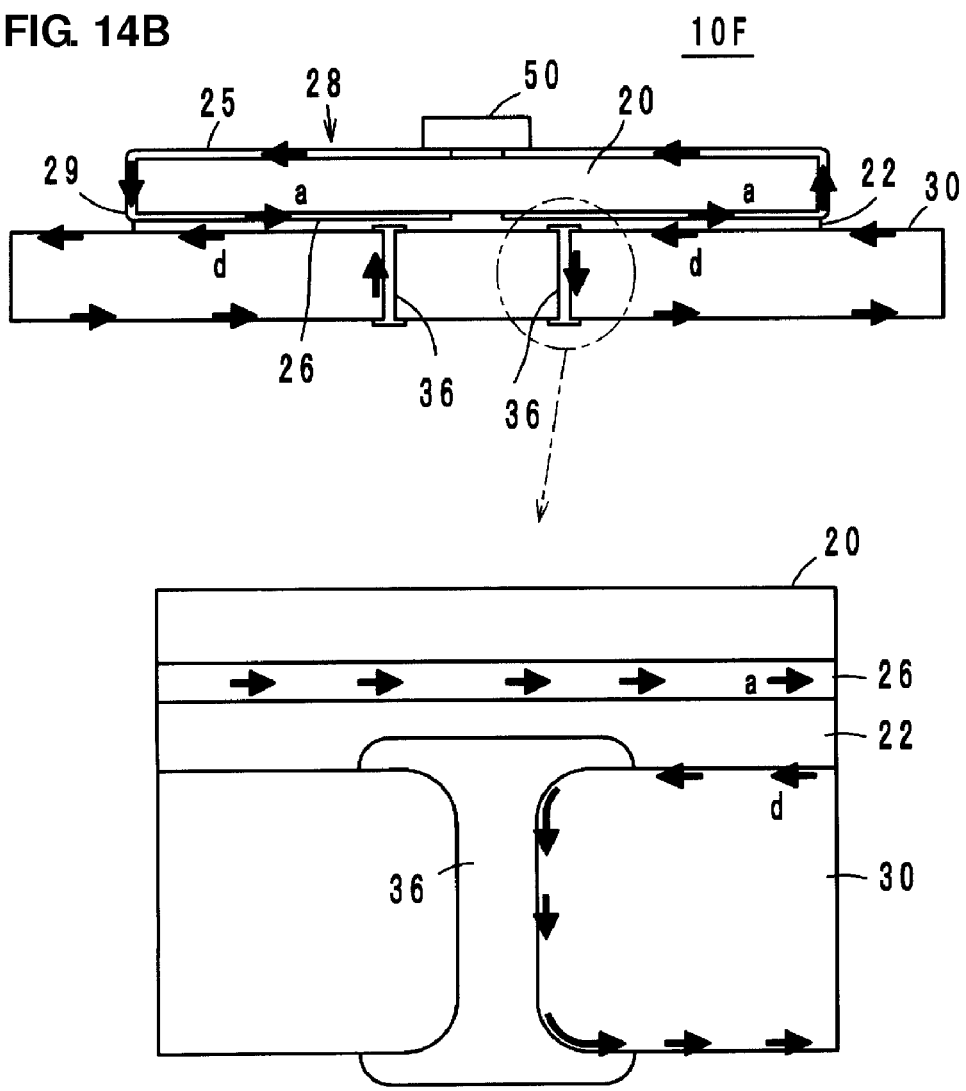

As illustrated in FIGS. 14A and 14B, in a wireless communication device 10F that is a sixth preferred embodiment, the loop-shaped electrode 28 including the radiation conductor 25, the ground conductor 26, and the interlayer connection conductor 29 has the same configuration as that of the third preferred embodiment, and the wireless communication device 10F differs in that the conductive member 36 electrically conducting the front and back surfaces of the metal plate 30 to each other is capacitively coupled to the ground conductor 26. In the present sixth preferred embodiment, a reversed current d is induced on the front surface of the metal plate 30 with respect to the high-frequency signal current a flowing through the ground conductor 26, and the induced current d is conducted to the back surface of the metal plate 30 through the vicinity of the surface boundary between the conductive member 36 and the through hole 33. By being subjected to capacitive coupling in this way, it is possible to cause the dielectric substrate 20 to easily adhere to the metal plate 30, and it is possible to thermally insulate the ground conductor 26 and the metal plate 30 from each other while the ground conductor 26 and the metal plate 30 are electrically connected to each other.

Seventh Preferred Embodiment

Figure 15:
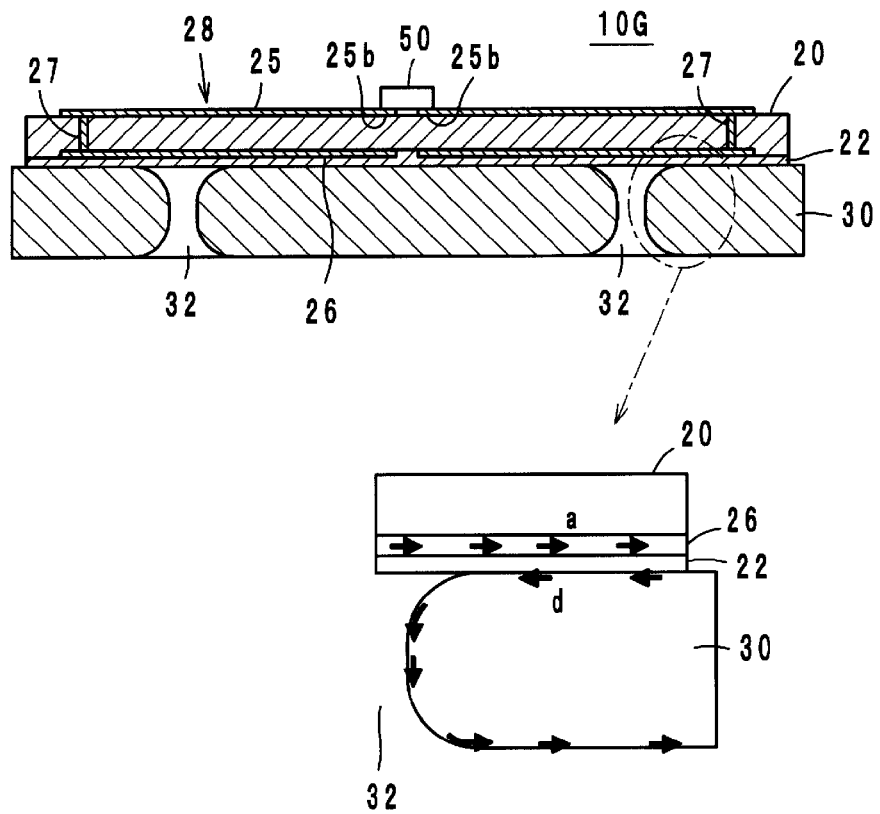
FIG. 15 is a cross-sectional view illustrating a wireless communication device according to another preferred embodiment of the present invention.

As illustrated in FIG. 15, in a wireless communication device 10G according to a seventh preferred embodiment of the present invention, the loop-shaped electrode 28 including the radiation conductor 25, the ground conductor 26, and the interlayer connection conductor 27 preferably has the same configuration as that of the first preferred embodiment, and in the metal plate 30, through holes 32 that penetrate from a front surface to a back surface are formed in a portion located directly below the ground conductor 26. The conductive member 35 is not provided, and the dielectric substrate 20 is fixed to the front surface of the metal plate 30 using the insulating adhesive 22.

In the present seventh preferred embodiment, the reversed current d is induced on the front surface of the metal plate 30 with respect to the high-frequency signal current a flowing through the ground conductor 26, and the induced current d is conducted to the back surface of the metal plate 30 through the vicinity of the inner peripheral surfaces of the through holes 32.

In addition, since the high-frequency signal current d propagates in the surface layer region of the metal plate 30, this through hole 32 may be filled with conductive material or insulating material. In addition, in the same way as described above, it is desirable that roundness is assigned to ridge line portions in which the through holes 32 open on the front and back surfaces of the metal plate 30.

Eighth Preferred Embodiment

Figure 16:
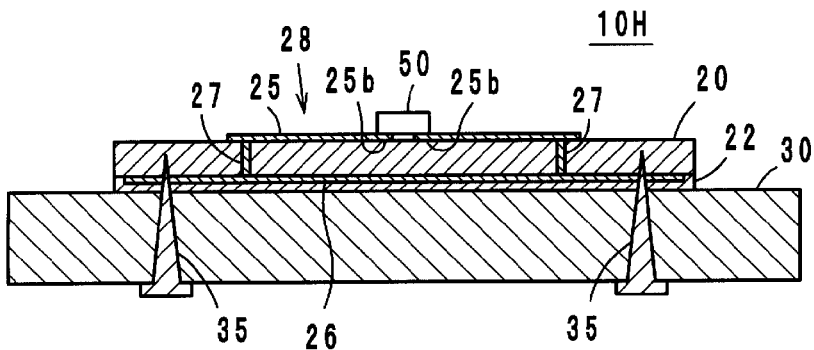
FIG. 16 is a cross-sectional view illustrating a wireless communication device according to yet another preferred embodiment of the present invention.

As illustrated in FIG. 16, in a wireless communication device 10H that is an eighth preferred embodiment, a screw member severs as the conductive member 35, and this screw member is screwed from the back surface of the metal plate 30 into the ground conductor 26. Owing to this screw member, the front surface and back surface of the metal plate 30 are electrically connected to each other, and the leading end of the screw member is electrically connected to the ground conductor 26. The other configuration preferably is the same as that of the first preferred embodiment, and the high-frequency signal current flowing through the ground conductor 26 is conducted to the back surface side of the metal plate 30 with the surface boundary portion between the screw member and the metal plate 30 serving as a current path portion.

Ninth Preferred Embodiment

Figure 17:
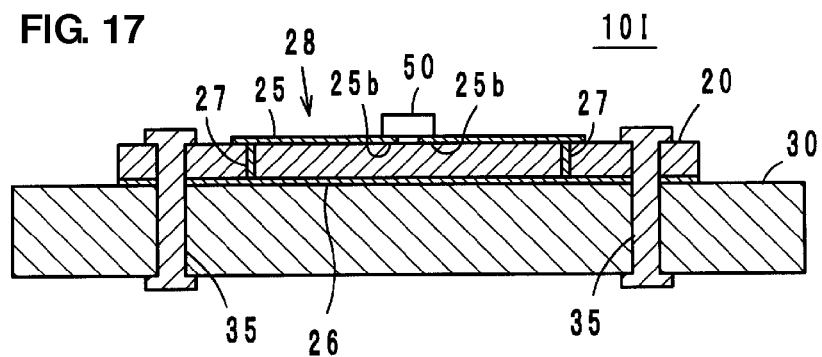
FIG. 17 is a cross-sectional view illustrating a wireless communication device according to a further preferred embodiment of the present invention.

As illustrated in FIG. 17, a wireless communication device 10I that is a ninth preferred embodiment preferably has the same configuration as that of the first preferred embodiment, and the dielectric substrate 20 is fixed to the front surface of the metal plate 30 by crimping the conductive member 35 through no insulating adhesive. The ground conductor 26 is electrically in contact with the front surface of the metal plate 30, and also electrically conducted to the conductive member 35. In the present ninth preferred embodiment, the high-frequency signal current flowing through the ground conductor 26 is also conducted to the back surface side of the metal plate 30 with the surface boundary portion between the conductive member 35 and the metal plate 30 defining a current path portion.

Other Preferred Embodiments

In addition, a wireless communication device and a metal article according to the present invention are not limited to the above-mentioned preferred embodiments, and various modifications may occur insofar as they are within the scope thereof.

In particular, a metal article to which the wireless communication device is attached may be various scaffolding members used for a building site in addition to the above-mentioned stepladder or may be a metal article used for the wide range of application other than the scaffolding members. More specifically, a metal article that has not fundamentally functioned as an antenna may be used as a radiation element.

As described above, preferred embodiments of the present invention are useful for a wireless communication device and a metal article, and in particular, is superior in terms of the fact that a radiation gain becomes large not only on a surface mounted to a metal plate or a metal member but also on a surface opposite to the mounting surface.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless communication device comprising:
   a wireless IC device configured to process a high-frequency signal;
   a radiation conductor coupled to the wireless IC device;
   a ground conductor connected to the radiation conductor; and
   a metal plate including first and second main surfaces arranged such that the ground conductor is coupled to the first main surface and a portion that defines a radiation element; wherein
   the metal plate includes a current path portion arranged to conduct a high-frequency signal current on a first main surface side to a second main surface side of the metal plate when a high-frequency signal is supplied from the wireless IC device through the radiation conductor and the ground conductor; and
   a conductive member electrically conducting the first main surface and the second main surface of the metal plate to each other is provided in the metal plate; and
   the current path portion is located in a surface boundary portion between the conductive member and the metal plate.

2. The wireless communication device according to claim 1, wherein the radiation conductor is provided on a first main surface of a dielectric substrate, and includes a power feeding portion connected to the wireless IC device, and the radiation conductor and the ground conductor are connected to each other through an interlayer connection conductor.

3. The wireless communication device according to claim 2, further comprising:
   a loop-shaped electrode including the radiation conductor, the ground conductor, and the interlayer connection conductor arranged to extend from the power feeding portion; wherein
   a loop plane of the loop-shaped electrode is disposed so as to be perpendicular or substantially perpendicular to the first main surface of the metal plate.

4. The wireless communication device according to claim 1, wherein the conductive member is electrically connected to the ground conductor.

5. The wireless communication device according to claim 1, further comprising:
   a through hole provided in the metal plate and penetrating through the first main surface and the second main surface of the metal plate; wherein
   the current path portion is provided in a peripheral surface portion of the through hole.

6. The wireless communication device according to claim 1, wherein the wireless IC device is a wireless IC chip arranged to process a high-frequency signal.

7. The wireless communication device according to claim 1, wherein the wireless IC device includes a wireless IC chip arranged to process a high-frequency signal and a feed circuit substrate including a feed circuit that has a predetermined resonance frequency.

8. A metal article comprising:
   a wireless communication device; and
   a metal plate; wherein
   the wireless communication device includes:
   a wireless IC device configured to process a high-frequency signal;
   a radiation conductor coupled to the wireless IC device, and
   a ground conductor connected to the radiation conductor; wherein
   the metal plate includes a current path portion arranged to conduct a high-frequency signal current on a first main surface side to a second main surface side of the metal plate when a high-frequency signal is supplied from the wireless IC device through the radiation conductor and the ground conductor; and
   a conductive member electrically conducting the first main surface and the second main surface of the metal plate to each other is provided in the metal plate; and
   the current path portion is located in a surface boundary portion between the conductive member and the metal plate.

* * * * *